US006877045B2

(12) United States Patent
Goode et al.

(10) Patent No.: US 6,877,045 B2
(45) Date of Patent: Apr. 5, 2005

(54) SYSTEMS, METHODS, AND COMPUTER PROGRAM PRODUCTS TO SCHEDULE I/O ACCESS TO TAKE ADVANTAGE OF DISK PARALLEL ACCESS VOLUMES

(75) Inventors: David Harold Goode, San Jose, CA (US); William Earl Malloy, Santa Clara, CA (US)

(73) Assignee: International Business Machines Corporation, NY (US)

( * ) Notice: Subject to any disclaimer, the term of this patent is extended or adjusted under 35 U.S.C. 154(b) by 317 days.

(21) Appl. No.: 10/033,926

(22) Filed: Dec. 18, 2001

(65) Prior Publication Data

US 2003/0140183 A1 Jul. 24, 2003

(51) Int. Cl.[7] ................................................. G06F 3/00
(52) U.S. Cl. .............................. 710/6; 710/20; 710/36; 712/225; 711/114
(58) Field of Search ............................. 710/1, 5, 6, 36, 710/52, 107, 20, 21, 39; 712/225; 711/114, 162

(56) References Cited

U.S. PATENT DOCUMENTS

| | | | |
|---|---|---|---|
| 4,408,273 A | 10/1983 | Plow ........................ | 364/200 |
| 5,097,533 A | 3/1992 | Burger et al. ............... | 395/500 |
| 5,337,412 A | 8/1994 | Baker et al. ................ | 395/275 |
| 5,386,525 A | 1/1995 | Noack ....................... | 395/400 |
| 5,530,897 A * | 6/1996 | Meritt ....................... | 395/829 |
| 5,640,596 A * | 6/1997 | Takamoto et al. .......... | 395/841 |
| 5,675,781 A | 10/1997 | Duncan et al. ............. | 395/608 |
| 5,813,005 A | 9/1998 | Tsuchida et al. ............ | 707/10 |
| 5,819,310 A | 10/1998 | Vishlitzky .................. | 711/114 |
| 5,870,587 A | 2/1999 | Danforth et al. ........... | 395/500 |
| 5,901,319 A | 5/1999 | Hirst ......................... | 395/710 |
| 5,915,131 A | 6/1999 | Knight et al. ............... | 395/892 |
| 5,925,109 A | 7/1999 | Bartz ......................... | 710/14 |

(Continued)

FOREIGN PATENT DOCUMENTS

EP  0756228  2/1998  ............. G06F/3/06

OTHER PUBLICATIONS

W. Kohler, *EMC Information Sharing: Direct Access to MVS Data from UNIX and NT,* Proc. of the 1999 ACM SIGMOD Int. Conf. on Management of Data Jun. 1–3 1999, Philadelphia, Pennsylvania, SIGMOND Record, vol. 28, Issue 2, Jun. 1999.

A Smith, et al., *A Versatile, Source–Independent System for Digital Data Management,* EOS Transactions, American Geophysical Union, vol. 67, No. 15, Apr. 15, 1986.

Martin et al., *Performance Analysis of the VSAM Method,* Angewandte Informatik, vol. 27, No. 8, pp. 334, 342, Aug. 1985. (German translation).

M. Simpson, *Using APL As a Preprocessing Selector from Large VSAM Files,* Conference Proc. APL 84, ACM, Finland Jun. 11–15, 1984. APL Quote Quad, vol. 14, No. 4, pp. 297–302, Jun. 1984.

*Primary Examiner*—Jeffrey Gaffin
*Assistant Examiner*—Rijue Mai
(74) *Attorney, Agent, or Firm*—Christine H. Smith

(57) ABSTRACT

Systems, methods, and computer products that improve the performance of computer-implemented I/O operations issued by complex applications that are directed to high-performance disk drives, and that may operate in conjunction with the product marketed under the trademark IBM S/390®. Such high-performance disk drives may include the IBM Shark® that supports the parallel access volumes feature.

36 Claims, 12 Drawing Sheets

U.S. PATENT DOCUMENTS

| | | | |
|---|---|---|---|
| 5,930,824 A | 7/1999 | Anglin et al. | 711/162 |
| 5,978,815 A | 11/1999 | Cabrera et al. | 707/204 |
| 5,999,930 A | 12/1999 | Wolff | 707/8 |
| 6,044,415 A | 3/2000 | Futral et al. | 710/33 |
| 6,101,558 A * | 8/2000 | Utsunnomiya et al. | 710/6 |
| 6,108,653 A | 8/2000 | Pereira | 707/7 |
| 6,112,257 A | 8/2000 | Mason, Jr. et al. | 710/18 |
| 6,122,685 A | 9/2000 | Bachmat | 710/74 |
| 6,141,707 A | 10/2000 | Halligan et al. | 710/36 |
| 6,167,459 A | 12/2000 | Beardsley et al. | 710/3 |
| 6,170,023 B1 | 1/2001 | Beardsley et al. | 710/36 |
| 6,182,158 B1 | 1/2001 | Kougiouris et al. | 709/328 |
| 6,185,638 B1 | 2/2001 | Beardsley et al. | 710/36 |
| 6,192,359 B1 | 2/2001 | Tsuchida et al. | 707/4 |
| 6,199,117 B1 | 3/2001 | Cox et al. | 709/328 |
| 6,209,059 B1 | 3/2001 | Ofer et al. | 711/114 |
| 6,216,211 B1 | 4/2001 | McBrearty et al. | 711/162 |
| 6,240,467 B1 * | 5/2001 | Beardsley et al. | 710/5 |

* cited by examiner

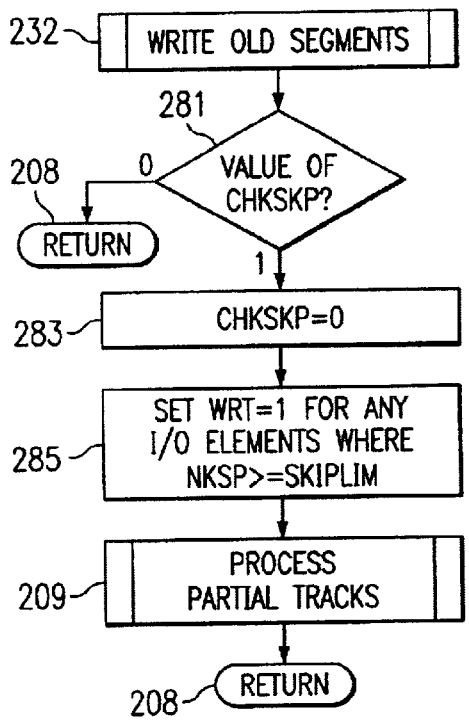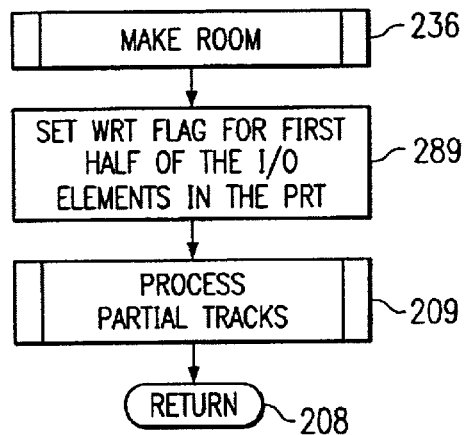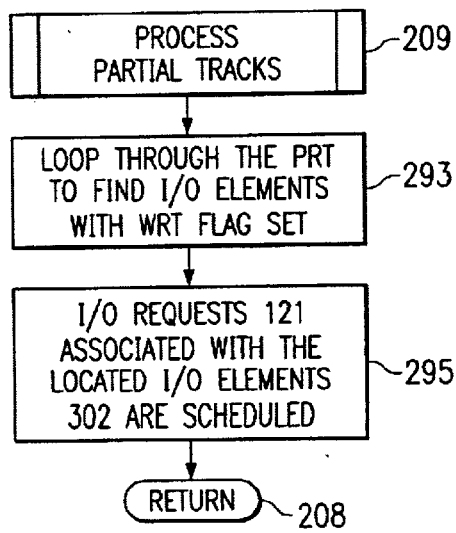

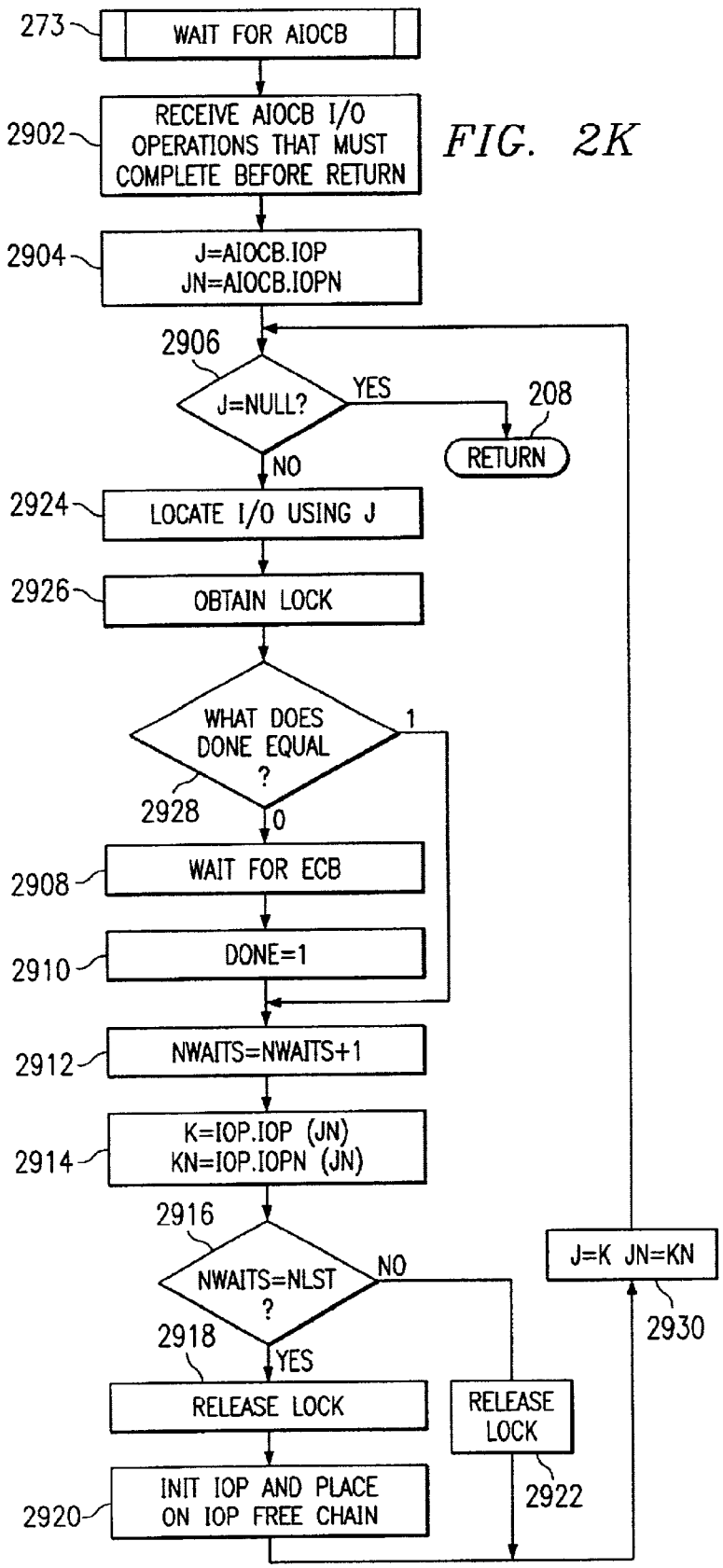

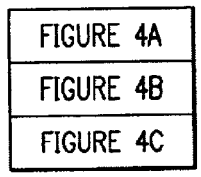
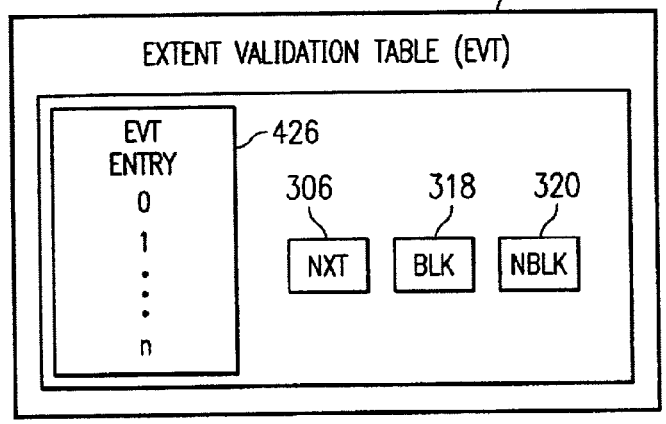
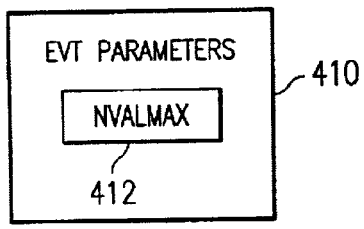
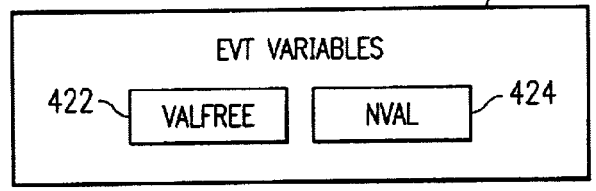
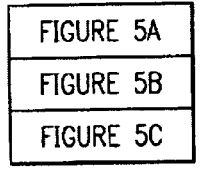
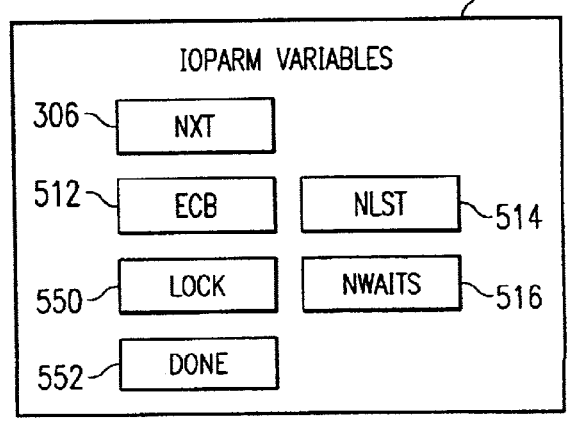

SYSTEMS, METHODS, AND COMPUTER PROGRAM PRODUCTS TO SCHEDULE I/O ACCESS TO TAKE ADVANTAGE OF DISK PARALLEL ACCESS VOLUMES

CROSS-REFERENCE TO RELATED APPLICATION

In co-pending application Ser. No. 10/033,810, entitled "Systems, Methods, and Computer Program Products to Improve Performance of Ported Applications, such as a Database," filed on the same date herewith, by William E. Malloy, et al., assigned to the assignee of the present invention, and incorporated herein in its entirety by this reference, there is described a method of bypassing the general-purpose I/O caching features of a computer system in favor of the specialized I/O caching features of the application. Although not limited thereto, the present invention employs such a method in one of its preferred embodiments.

In co-pending application Ser. No. 10/033,809, entitled "Systems, Methods, and Computer Program Products to Improve Performance of Ported Applications, such as a Database, Operating on UNIX System Services for the OS/390," filed on the same date herewith, by William E. Malloy, et al., assigned to the assignee of the present invention, and incorporated herein in its entirety by this reference, there is described a method of bypassing the general-purpose I/O caching features of the UNIX System Services for the OS/390 in favor of the specialized I/O caching features of the application. Although not limited thereto, the present invention employs such a method in one of its preferred embodiments.

BACKGROUND OF THE INVENTION

1. Field of the Invention

The present invention is directed to the field of accessing an Input/Output (I/O) device, such as a disk volume. It is more particularly directed to improving the performance of computer-implemented I/O operations that are directed to high performance disk drives, such as those having parallel access volumes features that operate in conjunction with the product marketed under the trademark IBM S/390®.

2. Description of the Background Art

On some disk systems, disk controllers and disks are capable of moving data at speeds several times faster than the channel connections that transmit the data between components of the computer, such as a processor, and the components of the disk controller. More particularly, slow channel transmission is a significant factor that may limit the performance of computer systems, such as the product marketed under the trademark IBM System/390® (S/390) and the associated disk systems. Disks, such as the direct access storage device sold under the trademark IBM Shark® 2105 (Shark®) that operate in conjunction with the S/390 may include a parallel access volumes feature that enables multiple I/O requests to be simultaneously directed to the disk. The parallel access volumes feature can help reduce the impact of slow channel transmission by enabling parallel access to multiple channels, herein referred to as "parallel channel paths" or "parallel disk paths," that are connected to the same disk controller. More particularly the parallel access volumes feature, in conjunction with the product marketed under the trademark OS/390, allows multiple I/O requests to be directed to the same file simultaneously.

The Shark® disk systems available from IBM on the S/390 operating with the OS/390 have the following important performance characteristics. The parallel access volumes feature allows an increased throughput to a device if multiple I/O requests can be scheduled concurrently. I/O requests that transfer full tracks are significantly faster than those that transfer partial tracks. Sequences of write requests issued in increasing order of disk addresses execute more quickly than unordered requests. I/O requests that transfer data to different parts of a disk track are not executed concurrently. Applications that operate on the S/390 with the Shark® disk will typically execute I/O requests more efficiently if they are written to take advantage of these performance characteristics. "Tracks" are generally units of data located on a computer system disk that can be accessed with the disk read head in a certain position. Shark® disk units for the OS/390 emulate older disks, including the emulation of physical geometry. So, in a Shark® disk system, a track is a range of storage capacity based on earlier disk geometry.

By further explanation, disk volumes are units of data storage that typically include data and the information used to access and manipulate the data. High-performance software applications, such as a database, may optimize disk access performance by directly managing disk I/O that is typically associated with disk volumes. That is, complex applications may issue multiple direct I/O requests that bypass the serialization operations of general-purpose operating systems. The direct I/O requests may be serviced via the parallel access volumes facility by choosing an available, parallel path to a disk controller. It will be appreciated that the general-purpose operating system typically supports direct I/O requests that bypass serialization operations. Direct I/O access may be used to facilitate use of the parallel access volumes facility. The terms "disk volume" and "volume" will be used interchangeably herein.

Complex applications, such as a database, may be written to facilitate later porting of the application for operation on a variety of computer systems. For example, the application may include a system-dependent code module that, among other features, centralizes the I/O request handling of the application. However, when a complex application is ported to operate on the S/390 the I/O requests may not take full advantage of the performance characteristics, such as the parallel access volumes feature, of the IBM Shark®. That is, I/O requests associated with complex applications may not operate so that the advantages of the high-performance characteristics of the IBM Shark® are exploited. For example, such I/O requests may not be issued so that they are transferred in full tracks. Also, I/O requests may not be issued in increasing order of disk addresses. Further, I/O requests may be issued that transfer data to different parts of a disk track.

From the foregoing it will be apparent that there is still a need to improve performance of I/O operations issued by complex applications that operate on the S/390 and that are directed to high performance disk drives, such as the IBM Shark® that supports parallel access volumes capabilities.

SUMMARY OF THE INVENTION

The invention may be implemented as systems, methods, and computer products that improve the performance of computer-implemented I/O operations issued by complex applications that are directed to high-performance disk drives, and that operate in conjunction with the product marketed under the trademark IBM S/390®. Such high-performance disk drives may include the IBM Shark® that supports the parallel access volumes feature. The advantageous features of the present invention may also improve I/O operations issued by applications that are directed to other disk hardware.

The parallel access volumes features of disk drives, such as the Shark®, allow increased I/O access to a disk drive device since multiple I/O requests to the disk controller can be scheduled concurrently. The product marketed under the trademark OS/390® operates in conjunction with the S/390 and the Shark® disk system to enable issuance of parallel I/O requests directed to the same disk volume. The present invention is applicable to complex applications such as databases, which typically assume responsibility for I/O serialization, caching, and related tasks. Further, such applications may operate with a system-dependent code module that, among other features, centralizes the I/O request handling of the application. Such applications may use a low-level direct I/O interface and an I/O subsystem, to facilitate I/O access to a disk drive device. An embodiment of the present invention collects, regroups, and issues I/O requests to a disk via direct I/O requests. An I/O subsystem that facilitates issuance of I/O requests may be used with an embodiment of the present invention. Although this is a convenient means of scheduling and managing direct I/O requests, other solutions for managing direct I/O requests are possible and the present invention may operate with any such solution.

The present invention includes a technique of scheduling I/O requests for a class of applications in such a way that the I/O throughput of the application is improved. When a disk volume contains data sets for many different applications and when I/O requests associated with the data sets are serviced concurrently, the benefit of using the parallel access volume feature of the Shark® is realized by the computer system as a whole. The preferred embodiment of the present invention takes a series of I/O requests from the application and splits single I/O write requests for large amounts of data into multiple concurrent I/O write requests, aggregates small I/O write requests into full-track I/O write requests when possible, and avoids inter-request serialization. The preferred embodiment of the present invention improves I/O operations for very large I/O write requests, long strings of relatively short I/O write requests, and I/O write requests that occur generally in the order in which they will be laid out on the disk by optimizing the number of I/O requests that are issued. The preferred embodiment operates most effectively on applications in which sets of I/O write requests are issued before the corresponding waits are issued. A "data set" is a file that is a named set of records that are typically used on the S/390 and that are stored or processed as a unit. The terms "data set" and "file" will be used interchangeably herein. The preferred embodiment of the present invention assumes that files are allocated such that the first block of the file is aligned with the beginning of a track. If this assumption were not true on a particular computer system, straightforward adjustments may be made to the techniques described herein, if it is possible to determine where within the track the first block of a file is located. While the preferred embodiment of the present invention applies to write I/O requests, the present invention is also useful in improving the I/O throughput of read I/O requests. Further, while the preferred embodiment of the present invention applies to asynchronous I/O requests, the present invention is also useful in improving the I/O throughput of synchronous I/O requests that may be divided in order to take advantage of the multiple paths of the Shark® disk.

Often, computer systems are designed so that changes associated with I/O operations are generally limited to a system-dependent code module in complex applications. The improvements described in the preferred embodiment of the present invention are confined almost entirely to the system-dependent code module that typically accommodates operating system features. Many complex software systems have a requirement to run on multiple operating systems. Because it is a common practice for such software to isolate system-specific code to a system-dependent code module, changes similar to those described herein could also be easily made to other computer systems.

In the preferred embodiment of the present invention, I/O requests are regrouped in order to benefit from performance advantages of writing complete tracks whenever possible. IBM Shark® disk control units ensure that two I/O requests affecting the same track do not execute concurrently. Ensuring that data is read and written in units of tracks, whenever possible, means that serialization at the disk control unit is avoided. Also, full-track I/O operations require fewer channel commands in the channel programs. This means that full-track operations are executed slightly more efficiently in both the S/390 and the IBM Shark® disk control unit.

The result of following the disclosed invention is that I/O throughput for certain I/O requests is improved by taking advantage of the capabilities of Shark® disk drives and their parallel access volumes feature. For example, small I/O requests, possibly as small as a single block, are aggregated until full tracks of data can be written. This aggregation reduces the number of interactions with the I/O subsystem. The resulting I/O requests are more efficient, are likely to be better sorted by increasing block address, and are less likely to cause serialization in the disk control unit.

Also, large I/O requests, those that are at least as large as the product of the number of parallel disk paths, PN, times the number of blocks that fit on a single track of the disk, SN, are broken up into PN requests. Therefore the PN requests may be transferred to the Shark® disk concurrently on PN different disk paths, thereby increasing I/O throughput for those requests by as much as a factor of PN. Although blocks within a data set do not need to be the same size, often all blocks in a data set are the same size. Commonly, file systems require I/O requests to be issued in blocks that are a multiple of the sector size. An application that uses direct I/O takes on the responsibility to issue I/O requests in increments of blocks and on block boundaries.

Further, medium sized I/O requests, those that are larger than a track but do not meet the definition above for a large request, obtain all of the benefits of small requests and part of the benefit of large requests. Medium I/O requests are able to send multiple tracks of I/O via multiple paths concurrently. Medium requests are broken up into at least two and as many as PN-1 single-track requests. Each single-track request is scheduled with the I/O subsystem. This ensures that medium I/O requests are transferred to the Shark® disk concurrently, on as many as PN-1 different disk paths, thereby increasing the throughput for those requests, as a group. Such requests also ensure that serialization does not occur at the disk control unit.

The preferred embodiment of the present invention schedules I/O requests to exploit the performance characteristics of Shark® disk systems. In the preferred embodiment of the present invention, loops that exist in many complex applications, such as a database, are located. The loops often generate many I/O write requests that may be issued before the corresponding waits are issued. Although we refer here to adapting the scheduling of I/O write requests generated in particular loops in a particular database application, the techniques are generally applicable to any application that issues multiple asynchronous I/O operations before waiting for the results of each I/O operation. Synchronous I/O requests cannot benefit from the methods of aggregation and reordering described herein without the danger of affecting the accuracy and integrity of application results. In such synchronous I/O requests, I/O request and wait are bound together, and it is assumed that the application depends on this behavior. However, I/O requests that span more than one track can benefit from the techniques of the present invention for avoiding serialization and I/O requests that span more than two full tracks can benefit from the techniques of the present invention for splitting I/O requests into smaller track-aligned requests.

Therefore the present invention enhances I/O access performance for complex applications over solutions of the past by optimizing transmission of the I/O requests over parallel channel paths that exploit the parallel access volumes feature of the Shark®. Although the present invention describes how to take advantage of particular features of a particular family of disk devices, the invention may provide benefits to any computer system with disk devices that have the same or similar characteristics as the Shark®. Other aspects and advantages of the present invention will become apparent from the following detailed description, taken in conjunction with the accompanying drawings, illustrating by way of example the principles of the invention.

BRIEF DESCRIPTION OF THE DRAWINGS

FIG. 4A is a block diagram that illustrates the Extent Validation Table;

FIG. 4B is a block diagram that illustrates the Extent Validation Table Parameters;

FIG. 4C is a block diagram that illustrates the Extent Validation Table Variables;

FIG. 5B is a block diagram that illustrates the IOPARM Variables;

In the following detailed description and in the several figures of the drawings, like elements are identified with like reference numerals.

DETAILED DESCRIPTION OF THE INVENTION

Figure 1:
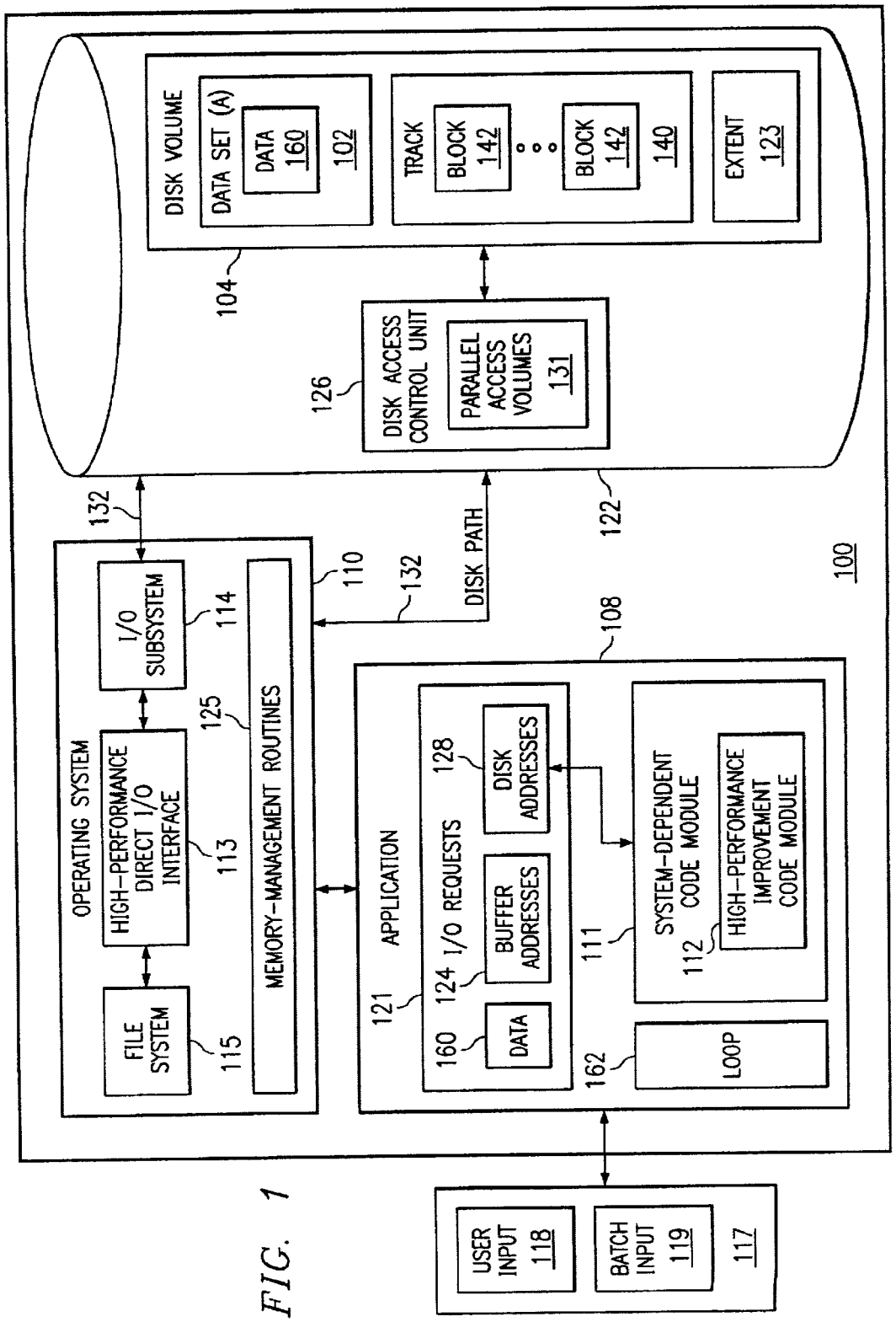
FIG. 1 is a block diagram that illustrates the present invention.

As shown in the drawings and for purposes of illustration, an embodiment of the invention advantageously improves the performance of computer-implemented I/O operations issued by complex applications that are directed to high-performance disk drives and that operate in conjunction with the product marketed under the trademark IBM S/390®. Such high-performance disk drives may include the IBM Shark® that supports the parallel access volumes feature. Existing systems have not been able to adequately improve performance of I/O operations issued by complex applications that operate on the S/390 and that are directed to high performance disk drives, such as the IBM Shark® that supports parallel access volumes capabilities. An embodiment of the present invention collects I/O requests, regroups the I/O requests, and issues the regrouped I/O requests to ensure optimal use of the parallel access volumes of the IBM Shark® disk.

FIG. 1 is a block diagram that describes the elements of the present invention that improves the performance of computer-implemented I/O operations by taking advantage of the I/O parallelism features of the IBM Shark® 122. Element 100 illustrates a computer system, such as the IBM S/390, and an article of manufacture that embody the present invention. The terms "disk" and "IBM Shark®" are used interchangeably herein.

Data sets 102, or files, that may be associated with application program code 108, are stored on disk volumes 104 that are associated with particular disks 122. Disk volumes 104 may be synonymous with disks 122. Applications 108 are generally able to perform I/O access operations to data sets 102 without having much detail about the underlying disk system 122. For example, the application may interact with elements of the operating system 110 such as the file system 115, the high-performance direct I/O interface 113, and the I/O subsystem 114. The high-performance direct I/O interface 113 may simplify I/O requests 121 from complex applications 108 by providing an interface to the I/O subsystem 114. The I/O subsystem 114 interacts via the disk path 132 with the disk 122. More particularly, the disk path 132 is used to communicate with the disk access control unit 126 that communicates with a particular disk volume 104 to access a data set 102. The performance enhancing feature of parallel access volumes 131, available on the IBM Shark® disk 122, enables the operating system 110 to choose a particular disk path 132 to the disk access control unit 126. Because the disk path 132 transfer rate between the operating system 110 and the disk access control unit 126 may be the slowest link in the system, taking advantage of the parallel access volumes 131 of the IBM Shark® 122 contributes to performance improvements that are realized by the computer system as a whole.

Figure 6:
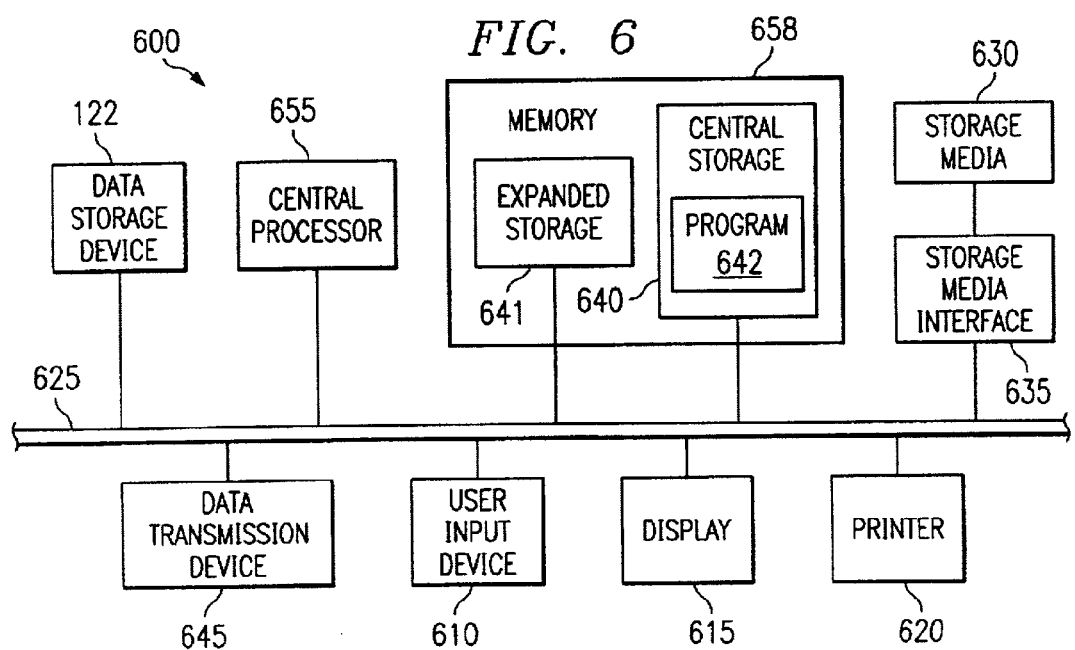
FIG. 6 is a block diagram of a computer system suitably configured for employment of the present invention.

For example, the application 108 issues multiple I/O requests 121 to the same data set 102. The Shark® disk 122 enables multiple I/O requests 121 to be serviced over multiple disk paths 132. The disk access control unit 126 receives the multiple I/O requests 121 from multiple disk paths 132. The feature of specific addressing of the disk path 132 enables two I/O requests 121 directed to a given data set 102 to concurrently transfer data 160 between the central processor 655 (as shown in FIG. 6) and the disk access control unit 126. The terms "I/O request" and "I/O command" will be used interchangeably herein.

The preferred embodiment of the present invention advantageously issues I/O access operations typically by direct I/O. By issuing I/O requests 121 the preferred embodiment of the present invention may advantageously use the parallel access volumes 131 of the IBM Shark® 122 to access a particular disk volume 104 and data set 102. The I/O requests 121, typically located in loops 162 in the application 108, are then identified, collected, and regrouped so that the advantages of the parallel access volumes 131 on the IBM Shark® disk 122 are exploited. For example, the I/O requests 121 are collected. Then, when at least enough I/O requests 121 to fill up one full track 140 are available, the I/O requests 121 are transmitted via an available disk path 132. More particularly, after each AIOCB 370 is processed, the preferred embodiment of the present invention determines if the collected I/O requests 121 fill up at least one track 140, and if so the full tracks 140 of I/O requests 121 are divided by the number of available disk paths 132. If the result is less than one, single-track requests are initiated. Otherwise, the number of full tracks 140 are distributed as evenly as possible among the available disk paths 132 during I/O transmission. Element 370 is described with reference to FIG. 3D.

Further, the I/O requests 121 used by the preferred embodiment of the present invention are asynchronous and are received from the application 108, thereby allowing the preferred embodiment of the present invention to reorder the asynchronous I/O requests 121. Asynchronous I/O commands 121 typically enable other computer operations to proceed that would otherwise wait until the I/O request 121 successfully completes. This allows I/O operations and other computer operations to overlap and proceed in an asynchronous fashion.

A system-dependent code module 111, such as the high-performance improvement code module 112, is available to communicate between the disk management code, such as the disk access control unit 126, and the application 108, such as database management code. That is, the preferred embodiment of the present invention advantageously operates by use of the high-performance improvement code module 112 to transfer I/O requests 121 from the application 108 to the disk 122 more efficiently than in the past. When a complex application 108 is ported for operation with on the S/390 it may not take full advantage of the I/O performance enhancing features of the S/390. The preferred embodiment of the high-performance improvement code module 112 collects and regroups I/O commands 121 to take advantage of the parallel access volumes 131 of the IBM Shark® 122. It will be appreciated that a user interface 117 may include user input 118 or batch input 119 that may be accepted by the application 108.

The high-performance improvement code module 112 operates as a component of the system-dependent code module 111, and receives I/O requests 121 from the application program code 108. Then, the high-performance improvement code module 112 accepts lists of buffer addresses 124 and disk addresses 128, and passes I/O requests 121 to the high-performance direct I/O interface 113. The buffer address 124 and the disk address 128 information is transmitted on to the I/O subsystem 114. Data 160 is associated with the I/O request 121. The buffer address 124 is a location identifier for the data 160 while it is stored in memory 658 (as shown in FIG. 6). The disk address 128 is a location identifier for the data 160 while it is stored on a disk 122.

In the preferred embodiment of the present invention, I/O commands 121 associated with application program code 108 that may be regrouped are identified. More particularly, the identified I/O requests 121 are combined into groups that are issued to the disk 122 via parallel disk paths 132. I/O requests 121 associated with complex applications 108 that may be issued as direct I/O requests 121 are successfully manipulated by the preferred embodiment of the present invention into combined I/O requests 121 that are, as much as possible, a complete track 140 in size. When track-aligned, these I/O requests 121 are the size of the optimal number of bytes that may be transferred over one of the disk paths 132 that is attached to a Shark® disk 122. When simultaneous I/O requests 121 are submitted to a Shark® disk 122, there will be a delay if these I/O requests 121 are attempting to write to the same track 140. Therefore, the preferred embodiment of the present invention ensures that two I/O requests 121 do not write to the same track 140, whenever possible. An extent 123 is the range of space on the disk 122 that is associated with the I/O request 121 and represents contiguous space on the disk 122. An extent 123 is used in the preferred embodiment of the present invention to efficiently transfer portions of an I/O request 121 to a disk 122.

The precise amount of data 160 associated with I/O requests 121 that fills a full track 140 on a disk 122 depends on the block 142 size used to format the disk 122. Documentation for the disk system 122 describes how many blocks 142 fit on a track for a given block 142 size. In the preferred embodiment, the database application 108 is configured to use blocks 142 that are eight thousand one hundred ninety-two bytes in size. With this block 142 size, six blocks 142 fit on a track 140. The preferred embodiment of the present invention determines the optimal manner of issued I/O requests 121 to take advantage of the parallel access volumes feature of the IBM Shark® disk 122 while ensuring that the I/O requests 121 are properly transmitted, in the appropriate order and at the appropriate time.

Therefore, the preferred embodiment of the present invention improves performance of I/O disk access functionality that operates on a S/390 and that is directed to disk drives 122 that have parallel access capabilities. That is, an embodiment of the present invention collects, regroups, and issues an optimal number of I/O requests 121 to take advantage the I/O parallelism features of the IBM Shark® disk 122.

Figure 2:
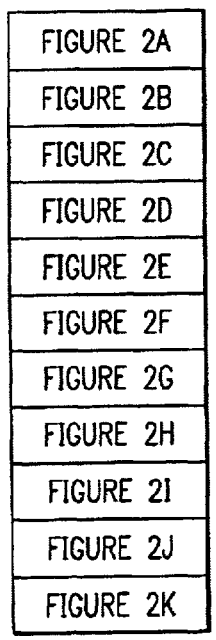
FIG. 2A is a flow diagram that illustrates the present invention.
FIG. 2B is a detailed flow diagram that illustrates the Initialize Request Module.
FIGS. 2C and 2D are detailed flow diagrams that illustrate the Split Request Module.
FIG. 2E is a detailed flow diagram that illustrates the Process Flush Module.
FIG. 2F is a detailed flow diagram that illustrates the Queue Pending Module.
FIG. 2G is a detailed flow diagram that illustrates the Write Segment Module.
FIG. 2H is a detailed flow diagram that illustrates the Write Old Segments Module.
FIG. 2I is a detailed flow diagram that illustrates the Make Room Module.
FIG. 2J is a detailed flow diagram that illustrates the Write Partial Tracks Module.
FIG. 2K is a detailed flow diagram that illustrates the Wait for AIOCB Module.

FIG. 2 includes FIGS. 2A–2K.

Figure 2B:
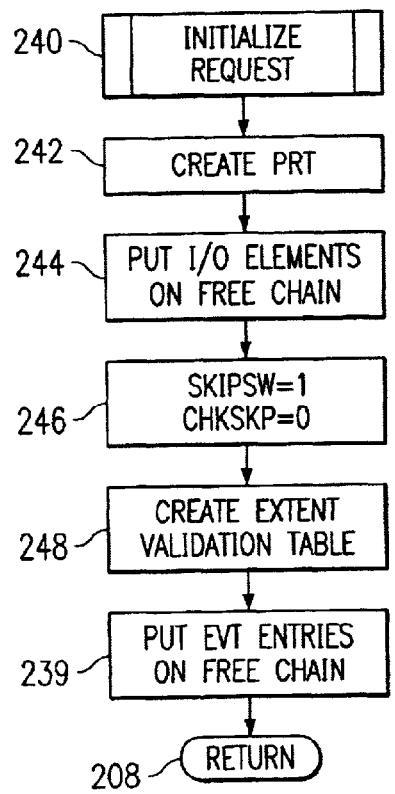
Figure 2C:
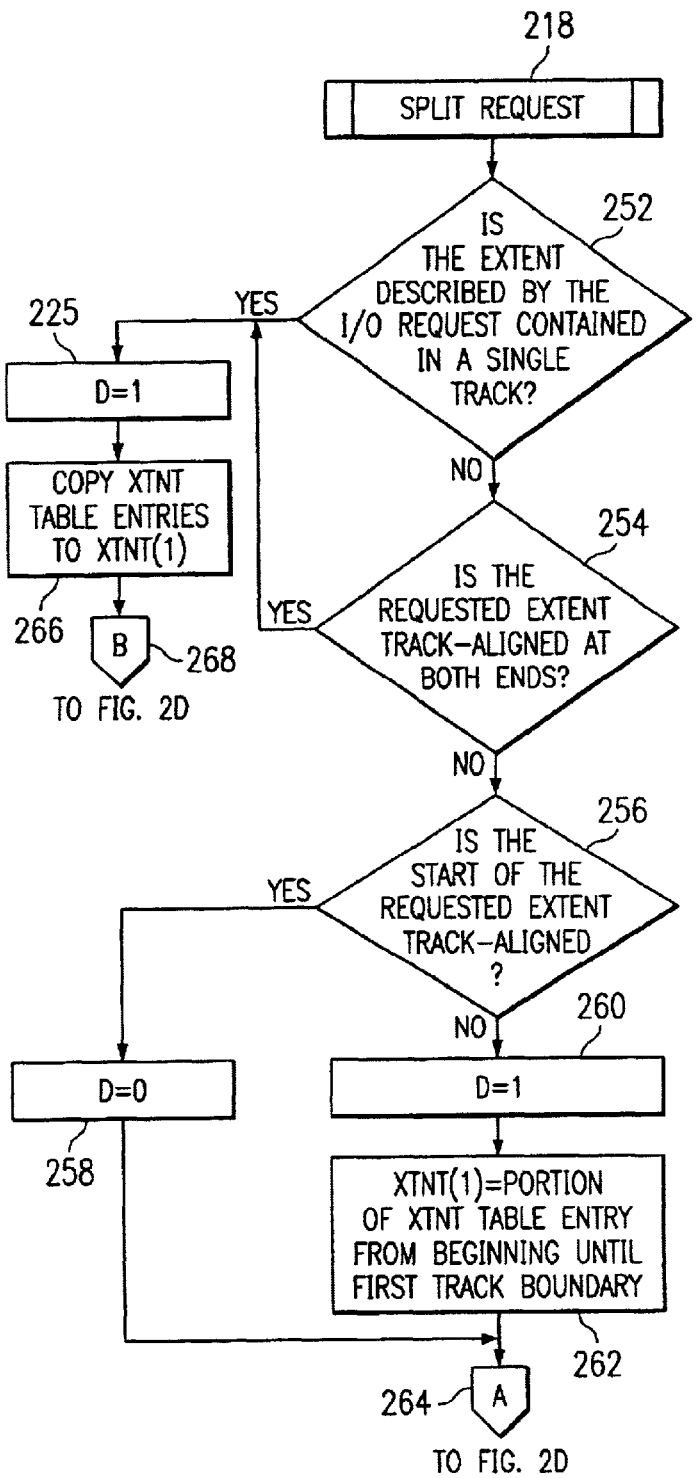
Figure 2A:
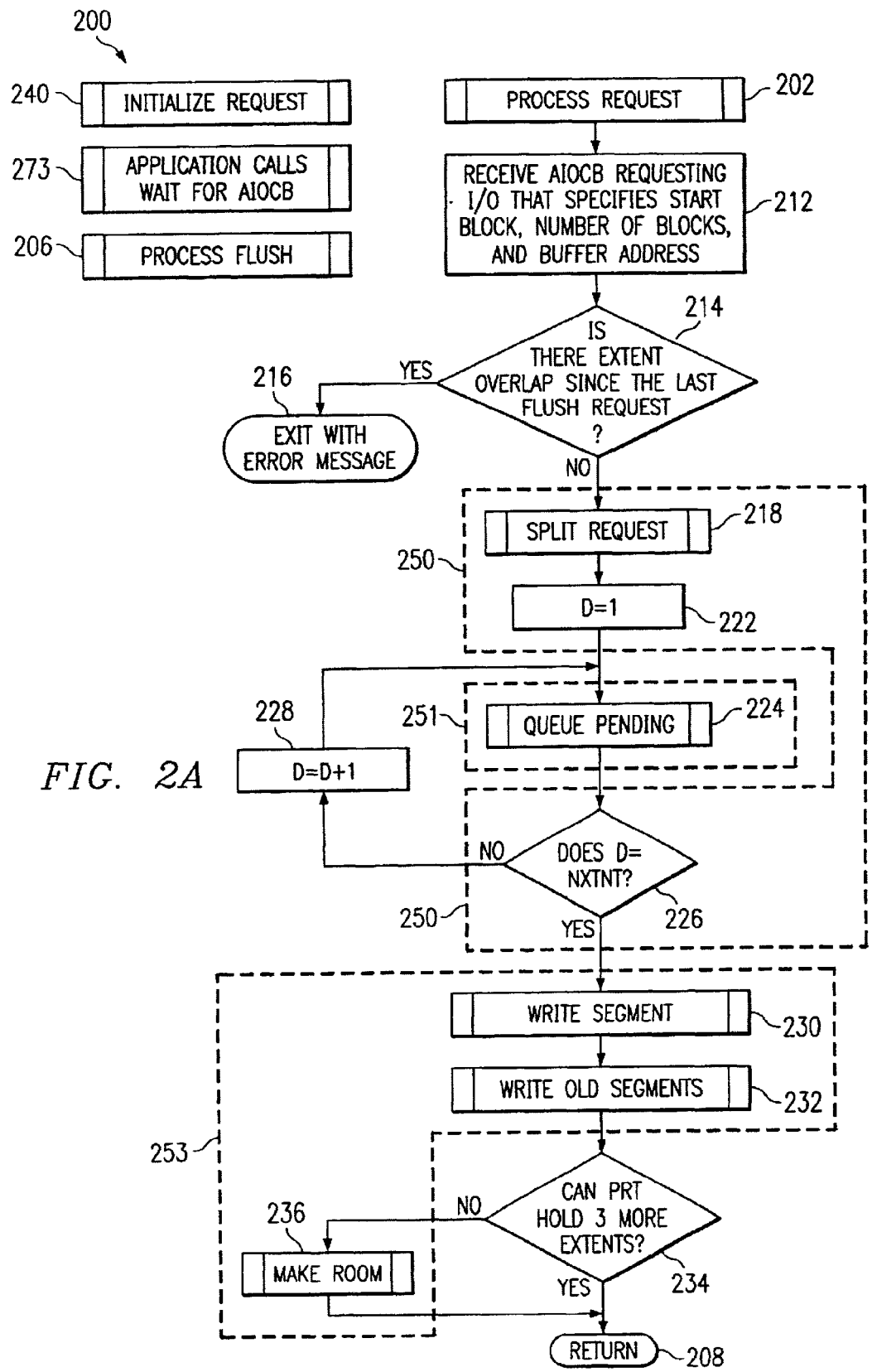

FIG. 2A describes a general method for practicing the present invention and as shown in element 200 the I/O access operations that use the parallel access volumes 131 of the IBM Shark® 122 are described. The operations of the present invention are described with respect to write I/O requests 121. It will be appreciated that the performance of read I/O requests 121 may also be improved by the present invention. Therefore the descriptions herein are not limited to write I/O requests 121. Element 121 is described with reference to FIG. 1.

Those skilled in the art will also recognize that if multiple threads of operation of the application 108 may be operating concurrently, then appropriate measures must be taken to ensure that access to the data structures described herein is properly serialized. Except in the discussion of FIG. 2K, the present description assumes that those skilled in the art can ensure proper serialization as appropriate for a particular application 108 and operating system 110. Elements 108 and 110 are described with reference to FIG. 1.

As shown in element 240 and described with reference to FIG. 2J, the Initialize Request Module 240 is called typically once when a file 102 is opened. The application 108 calls the Wait for AIOCB Module 273 as is discussed in detail with respect to FIG. 2K. The application 108 also calls the Process Flush Module 206 as is discussed in detail with respect to FIG. 2E. The preferred embodiment of the present invention processes I/O requests 121 by calling the Process Request Module, as shown in element 202. An embodiment of the present invention collects, regroups, and issues I/O requests 121 to a disk 122 via direct I/O requests using the I/O subsystem 114. Collection 250 is described with reference to elements 218, 222, and 226. Regrouping 251 is described with reference to element 224. Issuing 253 is described with reference to elements 230, 232, and 236. Elements 102, 114, and 122 are described with reference to FIG. 1.

The preferred embodiment of the present invention receives the AIOCB 370 as shown in element 212. The asynchronous I/O Control Block 370, AIOCB, is a control block that represents the I/O request 121 and is described with respect to FIG. 3. The AIOCB 370 specifies, among other information, the start block 318, the number of blocks 320, and the buffer address 322 of the I/O request 121. Those skilled in the art will appreciate that the BLK 318 represents the start block and NBLK 320 represents the number of blocks that along with BUF 322, the buffer address, enable transmission of the I/O request 121 to the disk 122. In the preferred embodiment of the present invention, BLK 318 and NBLK 320 are used to describe the location and size of an extent 123. Element 123 is described with reference to FIG. 1, and elements 318, 320, 322, and 370 are described with reference to FIG. 3.

Next, the test of element 214 determines if there is an extent 123 overlap since the last flush request. The extent 123 checking as described in the test of element 214 validates the assumption that between flush requests no two extents 123 overlap. That is, the test of element 214 validates that I/O requests 121 in overlapping extents 123 are not collected and regrouped according to the operation of the present invention because such I/O requests 121 may not be safely rearranged. If the result of the test of element 214 is YES, then the program execution exits with an error message as shown in element 216. If the result of the test of element 214 is "NO" then the Split Request Module is called, as shown in element 218. The Split Request Module 218 breaks the current I/O request 121 into track-aligned pieces, and returns the array XTNT 390, which describes the resulting track-aligned extents 123 that need to be queued, and the variable NXTNT 382, which represents the number of extents 123 that need to be queued, and is described with respect to FIG. 2C. Elements 380, 382, and 390 are described with reference to FIG. 3.

After the Split Request Module 218 is called, a counter variable, D, is set to one, as shown in element 222. Then, as shown in element 224 the Queue Pending Module is called. The Queue Pending Module adds XTNT(D) 390 to the Pending Requests Table (PRT) 300. The Queue Pending Module 224 is described with reference to FIG. 2F. A test, as shown in element 226, determines whether the counter element D is equal to NXTNT 382 and I/O elements 121 should be issued. If the result of the test of element 226 is NO, then the counter D is incremented by one, as shown in element 228. A variable is typically a data structure that may take different values, one at a time and the values of a variable are usually restricted to a certain data type. Element 300 is described with reference to FIG. 3.

If the result of the test of element 226 is YES, then the Write Segment Module is called, as shown in element 230. The Write Segment Module 230 is described with reference to FIG. 2G. A segment 305 is a set of contiguous I/O elements 302. Because the extents 123 described by any I/O element 302 added to the PRT 300 based on a requests from a single AIOCB 370 were obtained by splitting the extent 123 defined in the AIOCB 370, these extents 123 must be contiguous and, therefore, must be part of the same segment 305. The Write Segment Module 230 examines the segment 305 created by, or affected by these newly added I/O elements 302 to determine if it spans at least one full track 140. Whenever this condition occurs, the Write Segment Module 230 queues one or more I/O requests 121 for any complete tracks 140 represented in the PRT 300. Element 140 is described with reference to FIG. 1.

The Write Old Segments Module is called, as shown in element 232. The Write Old Segments Module 232 is described with reference to FIG. 2H. The Write Old Segments Module 232 writes segments 305 that may have been held too long waiting for a full track 140 of data 160 to be available for transmission to the disk 122. Elements 140 and 160 are described with reference to FIG. 1, and elements 302 and 305 are described with reference to FIG. 3.

The test of 234 now determines whether the PRT 300 can hold three more extents 123. The preferred embodiment of the present invention ensures that at least three extents 123 are available for processing an I/O request 121. When an I/O request 121 is processed the preferred embodiment of the present invention may allocate as many as three I/O elements 302 to store the information associated with the I/O request 121 in the PRT. That is, when an I/O request 121 is split there may be as many as three I/O elements 302 that are created if the I/O request 121 spans two track boundaries. When the I/O request 121 spans two track boundaries, then an I/O element 302 may be created for the information that is located prior to the first track boundary, an I/O element 302 may be created for the information that is located following the second track boundary, and an I/O element 302 may be created for the information between the two track boundaries. The number of rows in the PRT 300 does not change so it is necessary to determine whether there is enough room in the PRT 300 to process the next I/O request 121. If the PRT 300 can handle more I/O requests 121, as determined by a result of YES to the test of element 234, then the operation of the present invention returns as shown in element 208. Alternately, if the result of the test of element 234 is NO then the Make Room Module is called, as shown in element 236. The Make Room Module ensures that at least three entries will be available in the PRT 300 by scheduling I/O requests 121 for some of the I/O elements 302 in the PRT 300, and is described with reference to FIG. 2I.

As shown in FIG. 2B the Initialize Request Module 240 creates the data structures necessary to begin processing the preferred embodiment of the present invention. Initialization for the preferred embodiment of the present invention is an operation of file initialization and is handled on a per-file basis. More particularly, initialization occurs during the open operations associated with files 102. As shown in element 242, the PRT 300 is created. The I/O elements 302 included in the PRT 300 are put on the free chain, which is anchored at PNDFREE 352, as shown in element 244. Those skilled in the art will appreciate the operation of the "free chain" and its "anchor" that makes resources of the computer memory 658 (as shown in FIG. 6) available. The boolean counter variable skip switch, SKIPSW, 360 is set to one and the counter variable, CHKSKP, 358 is set to zero, as shown in element 246. Elements 352, 358, and 360 are described with reference to FIG. 3.

Also the extent validation table (EVT) 400 is created, as shown in element 248. The EVT entries 426 included in the EVT 400 are put on the EVT free chain that is anchored at VALFREE 422, as shown in element 239. Then, as shown in element 208, the operation of the present invention returns from the Initialize Request Module 240. Elements 400, 422, and 426 are described with reference to FIG. 4.

FIG. 2C describes the operation of the Split Request Module 218 that splits an I/O request 121 into extents 123. The I/O request 121 may be split into extents 123 that fill a complete track 140, and any portions that are not full-track extents 140 are separated from full-track extents 123. That is, the partial-track extents 123 are separated so that extents 123 are aligned on track 140 boundaries. This facilitates efficient transfer of I/O to the disk 122. An example of the partitioning of I/O requests 121 into extents 123 is: one extent 123 that ends on a track 140 boundary and partially fills the later portion of the track 140, one extent that fully fills the next track 140, and a last extent 123 that partially fills the first part of another track 140. Elements 121, 123 and 140 are discussed with reference to FIG. 1.

As shown in element 252, a test determines whether the extent 123 described by the I/O request 121, as represented by an AIOCB 370 is contained in a single track 140. The preferred embodiment of the present invention is dependent on the assumption that data sets 102 start at the beginning of a track 140. It will be appreciated that this assumption is not required to practice the present invention. For example, the assumption could be eliminated by querying a file system 115 or a disk access control unit 126 to determine the starting location of a data set 102. If the result of the test of element 252 is NO, then it is determined whether the requested extent 123 is track-aligned at both ends, as shown in element 254. The XTNT entries 386 include BLK 318 and NBLK 320 values that define an extent 123. If the result of the test of element 252 is YES or the result of the test of element 254 is YES, then the counter D is set to one, as shown in element 225. After the operation of the Split Request Module 218, the counter D represents the number of XTNT entries 386 that have been filled with extent 123 descriptions by splitting the I/O request 121 as represented in the AIOCB 370. Further as shown in element 266, the extent 123 information from the AIOCB 370 is copied to XTNT(1) 392. Then, as shown in element 268 of FIG. 2C a transition to the operations described in FIG. 2D and element 284 occurs. Elements 102, 115, 126, and 140 are described with reference to FIG. 1A, and elements 300, 302, 318, 320, 370, 386, and 392 are described with reference to FIG. 3.

If the result of the test of element 254 is NO, then it is determined whether the start of the extent 123 specified by the I/O request 121, as represented by the AIOCB 370, is track-aligned, shown in element 256. If the start of the extent 123 lies on a track 140 boundary, then the counter, D, is set to zero, as shown in element 258. However, if the start of the extent 123, specified in the AIOCB 370, does not lie on a track boundary, the partial-track portions of the extent 123 preceding the first track 140 boundary in the extent 123 are separated from the remainder of the extent 123. At this point, the XTNT entries 386 indexed by D, XTNT(D) 390, now represent the first portion of the split current AIOCB 370. Therefore the counter, D, is set to one, as shown in element 260. Further the XTNT entry, XTNT(1) 392, represents the portion of the I/O request 121 extent 123 from the beginning to the first track 140 boundary, as shown in element 262. Now, from either element 258 or element 262 the operation of the Split Request Module 218 continues to element 264 in FIG. 2C and on to element 270 in FIG. 2D.

Figure 2D:
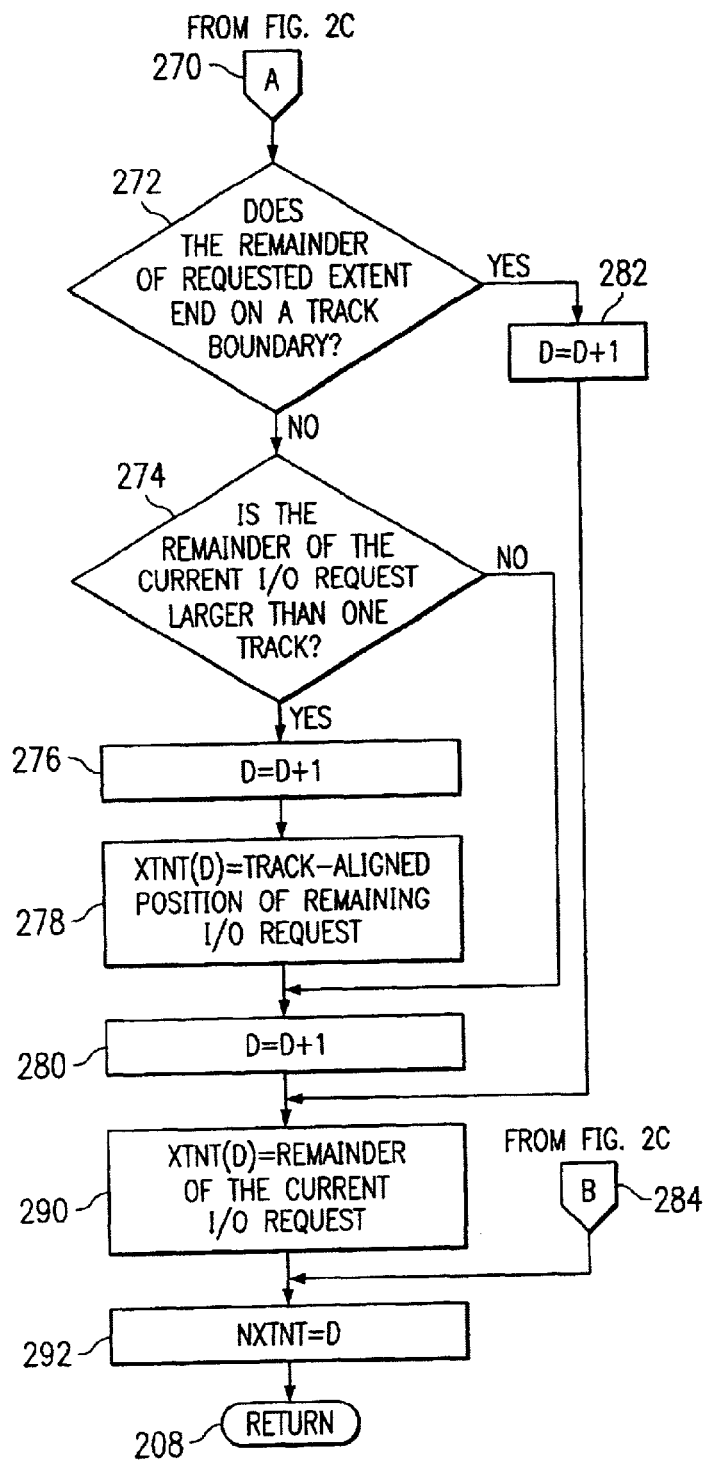

FIG. 2D is a continuation of the description of the operation of the Split Request Module 218. As shown in element 272, a test determines whether the remainder of the extent 123 specified by the present AIOCB 370 ends on a track 140 boundary. If the result of the test of element 272 is YES, then the end of the extent 123 is track-aligned. The counter, D, is incremented by one, as shown in element 282. Therefore as shown in element 290, the XTNT entry 386 now represents the remainder of the extent 123. Elements 123 and 140 are described with reference to FIG. 1, and elements 302, 386, and 390 are described with reference to FIG. 3.

Alternately, if the result of the test of element 272 is NO, then as shown in element 274, it is determined whether the remainder of the current extent 123 is larger than one track 140. If the result of the test of element 274 is YES, then as shown in element 276 the counter, D, is incremented by one. Also, as shown in element 278 the XTNT entry 386 represents the track-aligned position of the remaining extent 123. Now, as shown in element 280, either from element 278 or from a negative result of the test of element 274, the counter, D, is incremented by one. Therefore as shown in element 290, the XTNT entry 386 now represents the remainder of the current I/O request 121. Element 121 is described with reference to FIG. 1.

The resulting entries in the XTNT 390 that are split are now either partial-track requests or are track-aligned at both ends. Buffer addresses, BUF 322, are adjusted as appropriate in the entries of the XTNT 390. Element 322 is described with reference to FIG. 3.

As shown in element 292, the variable NXTNT 382 is set to the value of D and represents the number of extents 123 that need to be queued. Element 292 is reached either from element 290 or from element 284. Finally, the control of execution of the Split Request Module 218 is returned, as shown in element 208. Element 382 is described with reference to FIG. 3.

Figure 2E:
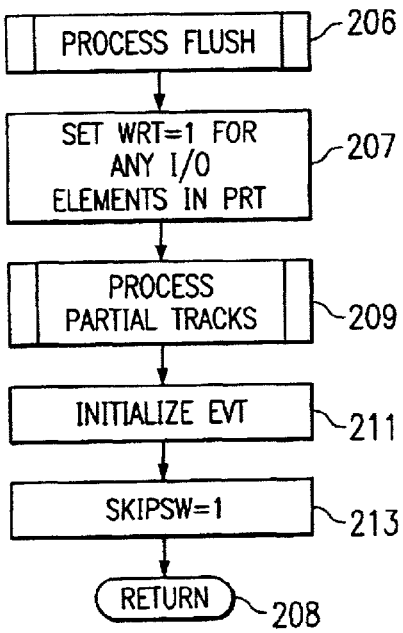

FIG. 2E describes the operation of the Process Flush Module 206. When the application 108 is modified according to the present invention, calls to the Process Flush Module 206 are inserted into the application 108 code after the end of an identified sequence of asynchronous direct I/O requests 121. The Process Flush Module 206 is called in the preferred embodiment of the present invention after the I/O requests 121 in one loop 162 have been scheduled. After the completion of such a sequence of I/O requests 121, the PRT 300 may be empty, but it may also contain one or more I/O elements 302 that did not previously qualify to be scheduled according to the present invention. The Process Flush Module 206 ensures that any I/O elements 302 remaining in the PRT 300 are scheduled before the application 108 proceeds. As shown in element 207 the variable, WRT 326 is set to one for any I/O elements 302 remaining in the PRT 300. Then, the Process Partial Tracks Module 209 is called to schedule the marked I/O elements 302. The Process Partial Tracks Module 209 is described with reference to FIG. 2J. The EVT 400 is initialized, as shown in element 211. As shown in element 213, the variable SKIPSW 360 is set to one to ensure that the first segment 305 after the I/O flush is queued for a timely transfer to the disk 122. This timely transfer will ensure that the I/O elements 302 are transferred without a lengthy wait. Elements 121, 122 and 162 are described with reference to FIG. 1, elements 300, 302, 326, and 360 are described with reference to FIG. 3, and element 400 is described with reference to FIG. 4A.

Figure 2F:
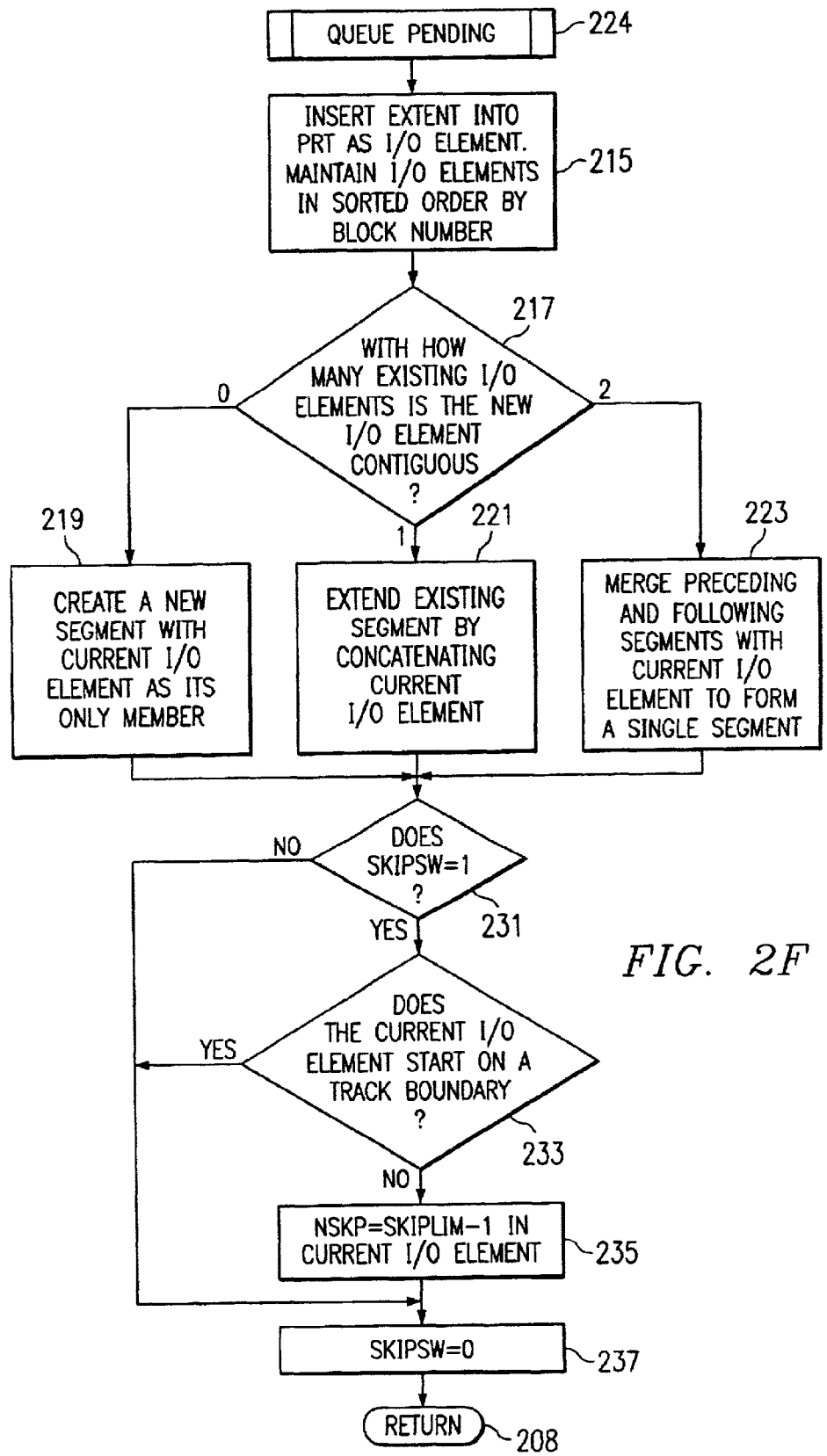

FIG. 2F describes the operation of the Queue Pending Module 224. The Queue Pending Module 224 is called from the Process Request Module 202 in element 224. Each call to Queue Pending 224 receives and processes a single XTNT entry 386. As shown in element 215 the extent 123 is inserted into the PRT 300 as one or more I/O elements 302, and each of the I/O elements 302 is added to the PRT 300, one at a time. Further as shown in element 215 the I/O elements 302 are maintained in order sorted by block 142 number. As each I/O element 302 is added to the PRT 300, the preceding and following I/O element 302 are checked to see if they are contiguous with the newly added I/O element 302, as shown in element 217. Sets of contiguous I/O elements 302 are called a segment 305. If the new I/O element 302 is not contiguous with another I/O element 302, the new I/O element 302 forms a new segment 305 as shown in element 219. That is, if the result of the test of element 217 is zero, then a new segment 305 is created with the current I/O element 302 as its only member, as shown in element 219. Otherwise, the new I/O element 302 becomes part of either the preceding or following segment 305, or joins the preceding and following segments 305 into a single segment 305. Therefore, if the result of the test of element 217 is one, the existing segment 305 is concatenated with the current I/O element 302, as shown in element 221. Finally, if the result of the test of element 217 is two, then the preceding and following segments 305 are merged with the current I/O element 302 to form a single segment 305, as shown in element 223. Elements 123 and 142 are described with reference to FIG. 1, and elements 300, 302, 305, and 386 are described with reference to FIG. 3.

Then bookkeeping activities are performed. As shown in element 231 it is determined if the variable, SKIPSW 360 is equal to one. If the result of the test of element 231 is YES, then it is determined if the current I/O element 302 starts on a track 140 boundary, as shown in element 233. If the result of the test of element 233 is NO, then the variable, NSKP, 324 is set to the value of SKIPLIM 340 minus one in the current I/O element 302. Element 140 is described with reference to FIG. 1, and elements 324, 350, and 360 are described with reference to FIG. 3.

Then the variable, SMIPSW 360 is set to zero, as shown in element 327. Element 327 is reached from element 235, from a negative result of the test of element 231, or from a positive result of the test of element 233. Finally, the execution of the Queue Pending Module 224 returns, as shown in element 208.

Figure 2G:
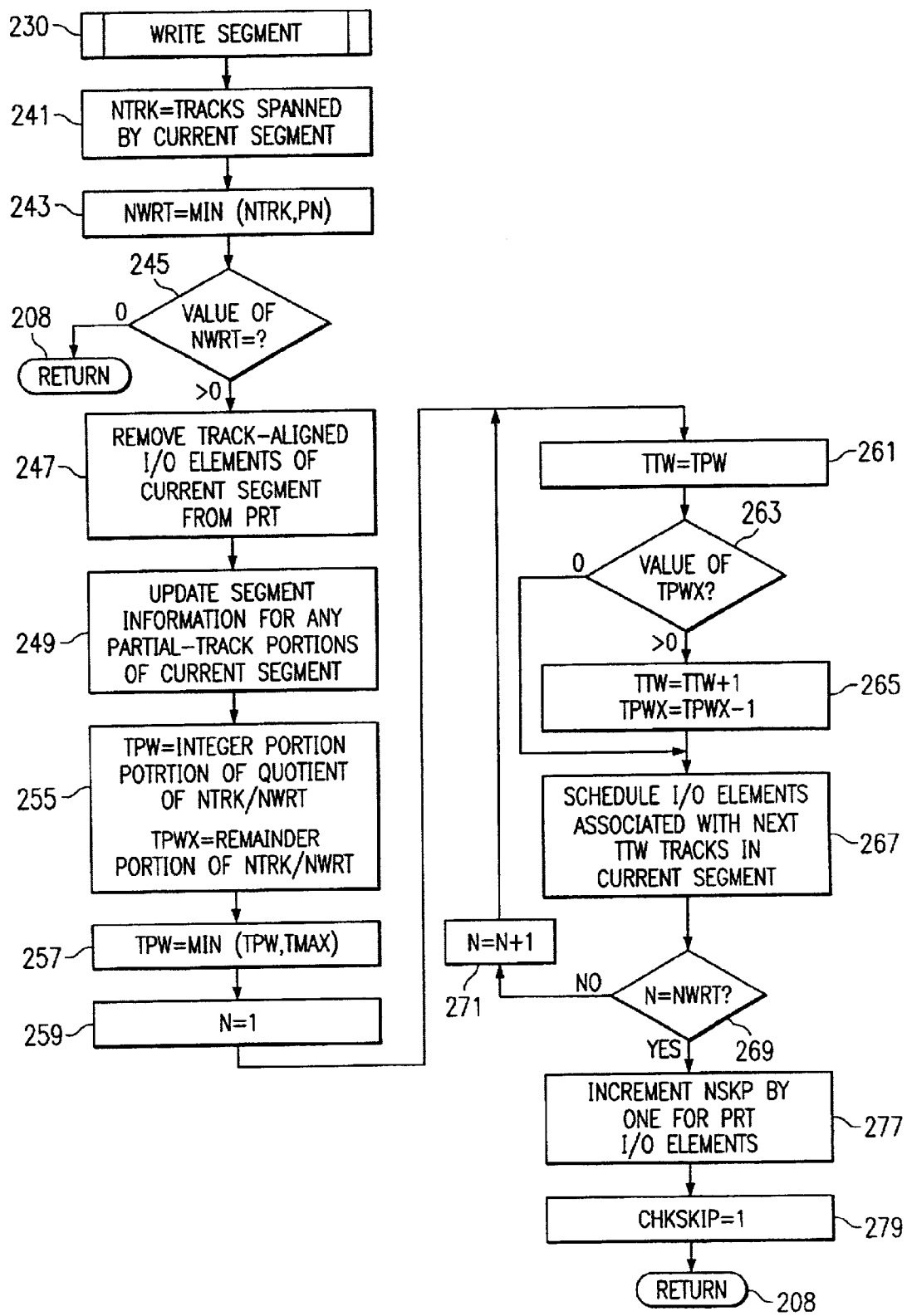

FIG. 2G describes the operation of the Write Segment Module 230 that may schedule a set of contiguous I/O elements 302 to be written to the disk 122. The variable NTRK 524 is set to the number of tracks 140 spanned by the current segment 305, as shown in element 241. The segment 305 containing the most recently added I/O element 302 is examined to see if it spans at least one full track 140. If it does, then if fewer than PN 332 tracks 140 are spanned, as many single-track I/O write requests 121 as possible are scheduled. PN 332 is a parameter that describes the level of parallelism of I/O transfer. The variable NWRT 522 is set to the minimum of NTRK 524 and PN 332 as shown in element 243. Further, and by way of explanation, if the number of tracks 140 that are spanned is greater than the value of PN 332 the preferred embodiment of the present invention only uses the value of PN 332. That is, since there are only PN available parallel disk paths 132 the value of NWRT 522 is limited by PN 332. When NTRK 524 is less than PN 332, the value of NWRT 522 is limited by NTRK 524. In other words, when the number of tracks 140 available to be written is less than the number of available disk paths 132, NTRK 524 single-track I/O requests 121 are scheduled. When NTRK 524 is at least as large as PN 332, the tracks 140 available to be written are spread as evenly as possible among the available disk paths 122. The method of the present invention optimizes for the Shark® disk 122. It will be appreciated that other thresholds and tests may be used, instead of the test associated with PN 332, to determine the most efficient means of transferring I/O elements 302 to a disk 122. A parameter is typically a value that can be varied to make a system handle a variety of situations or environments. In the preferred embodiment of the present parameters are numeric values. Elements 121, 122, 132, 140, 150, and 160 are described with reference to FIG. 1, elements 302, 332, and 350 are described with reference to FIG. 3, and elements 522 and 524 are described with reference to FIG. 5.

Then the value of NWRT 522 is determined, as shown in element 245. If the value of NWRT 522 is zero, then the execution of the Write Segment Module 230 returns, as shown in element 208. If the value of NWRT 522 is greater than zero then the track-aligned I/O elements 302 of the current segment 305 are removed from the PRT 300, as shown in element 247. Then, as shown in element 249, information associated with the segment 305 for partial-track portions of the current segment 305 are updated in the PRT 300. Element 300 is described with reference to FIG. 3.

Then, as shown in element 255, the "tracks per write" variable, TPW, 526 is set to the integer portion and the variable TPWX 528 is set to the remainder portion of the quotient NTRK 524 divided by NWRT 522. According to the preferred embodiment of the present invention that enhances I/O performance of the Shark® disk 122, the variable TPW 526 is set to the minimum of TPW 526 and TMAX 532 as shown in element 257. TMAX 532 represents the largest I/O request 121 that can be efficiently handled. Those skilled in the art will appreciate that computer systems typically are designed so that I/O may be efficiently handled up to a certain threshold size. Therefore, the I/O throughput advantage of splitting I/O requests to take advantage of the parallelism features of the Shark® disk 122 is balanced against the limitations of the computer system, as exemplified in the TMAX 532 variable. In the preferred embodiment of the present invention TMAX 532 is defined in units of tracks 140. Then the counter variable, N, is set to one, as shown in element 259. The variable TTW 530 is set to TPW 526, as shown in element 261. Elements 526, 528, 530, and 532 are described with reference to FIG. 5.

Then the value of the variable, TPWX 528, is determined, as shown in element 263. If the value of the variable, TPWX 528, is greater than zero, bookkeeping is done as shown in element 265. That is, the variable TTW 530 is increased by one. Also, the variable TPWX 528 is decreased by one. Then, as shown in element 267, the I/O elements 302 associated with the next TTW 530 tracks 140 in the current segment 305 are scheduled. Element 267 is reached either from element 265 or, when the value of the variable TPWX 528 is zero, from element 263.

As shown in element 269 it is determined whether the counter N is equal to the variable NWRT 522. If the result of the test of element 269 is NO, then the method of the present invention increases the value of the counter N by one, as shown in element 271. Then the method loops back to element 261. When the test of element 269 is YES, bookkeeping is performed. As shown in element 277, the variable NSKP 324 is increased by one for the I/O elements 302 in the PRT 300. Also, the variable CHKSKP 358 is increased by one, as shown in element 279. Then, the execution of the Write Segment Module 230 returns, as shown in element 208. Elements 324 and 358 are described with reference to FIG. 3.

FIG. 2H describes the Write Old Segments Module 232 that schedules writes of I/O elements 302 if a threshold is exceeded. Initially, the value of the variable, CHKSKP 358 is determined, as shown in element 281. CHKSKP 358 is set to one each time Write Segment 230 actually schedules one or more I/O elements 302 to be written to disk 122. If the value of the variable CHKSKP 358 is zero, the age of the I/O elements 302 in the PRT 300 cannot have changed since the last time Write Old Segments 232 was called. Therefore, the execution of the Write Old Segments Module 232 returns, as shown in element 208. Element 122 is described with reference to FIG. 1, and elements 300, 302, and 358 are described with reference to FIG. 3.

If the result of the test of element 281 is one, then, as shown in element 283, the value of the variable CHKSKP 358 is set to zero, to ensure that Write Old Segments 232 returns immediately until Write Segment 230 actually schedules another I/O element 302. Then as shown in element 285, the variable, WRT 326 is set to one for any I/O elements 302 where the variable NSKP 324 is greater than or equal to the value of the variable SKIPLIM 340. This ensures that any I/O elements 302 that are not included in a full track 140 of data 160 that exceed an age threshold will be scheduled to be written by Process Partial Tracks 209. Finally, the Process Partial Tracks Module 209 is called. The Process Partial Tracks Module 209 is described with reference to FIG. 2J. Then the execution of the Write Old Segments 232 returns, as shown in element 208. Element 160 is described with reference to FIG. 1A, and elements 324, 326, and 340 are described with reference to FIG. 3.

FIG. 2I describes the Make Room Module 236 that schedules a portion of the PRT 300 when there is insufficient room in the PRT 300 for further manipulation of I/O elements 302. Any I/O element 302 in which the WRT flag 326 that has been set will be scheduled to be written to disk 122 by Process Partial Tracks 209. Therefore, as shown in element 289, the WRT flag 326 is set for the first and oldest half of the I/O elements 302 in the PRT 300. These I/O elements 302 are likely to be the oldest in the PRT 300, and selecting these elements ensures that the I/O elements 302 are scheduled in order of increasing values of BLK 318, their disk address. Then, as shown in element 209, the Process Partial Tracks Module 209 is called to schedule the I/O elements 302 in which the WRT flag 326 is set to be written to the disk 122. This will make room in the PRT 300 for more I/O elements 302. Finally, the execution of the Make Room Module 236 returns, as shown in element 208. Element 122 is described with reference to FIG. 1, and elements 300, 302, 318, and 326 are described with reference to FIG. 3.

FIG. 2J describes the Process Partial Tracks Module 209. As shown in element 293, the preferred embodiment of the present invention loops through the PRT 300 to find the I/O elements 302 with the WRT flag 336 set. Then, as shown in element 295, I/O requests 121 associated with the located I/O elements 302 are scheduled. More particularly, the I/O requests 121 are scheduled with associated segments 305 so that they are most efficiently transmitted to the disk 122. That is, the I/O requests 121 are scheduled with the minimum number of I/O requests 121 by combining segments 305 that are located sequentially on a disk 122 for a minimum number of transmissions to the disk 122. More particularly, I/O requests 121 are scheduled so that as many segments 305 as possible fit into each IOPARM 500, without causing an I/O request 121 for a single segment 305 to be split between two IOPARMs 500. Recall that a segment 305 is a set of I/O elements 302 that are contiguous. The IOPARM 500 includes SN 336 IOPARM entries 540. Recall that SN 336 is the number of blocks 142 in a track 140. Because efficient I/O transmission occurs on a per-track basis, and to avoid serialization between I/O requests 121, it is most efficient to issue only one I/O write to the same track 140 at the same time. Therefore, the combination of segments 305 into each IOPARM 500 is implemented so that multiple, partial-track writes are not issued to the same track 140 simultaneously. Then the execution of the Process Partial Tracks Module 209 returns, as shown in element 208. Elements 121, 122, 140, and 142 are described with reference to FIG. 1, elements 300, 302, 305, and 336 are described with reference to FIG. 3, and elements 500 and 540 are described with reference to FIG. 5.

FIG. 2K describes the Wait for AIOCB Module 273. In order to ensure proper completion of I/O requests 121, the Wait for AIOCB Module 273 must be called by the application 108. A FLUSH call indicates that a series of I/O requests 121 from the modified application 108 is complete. In order to release the memory reserved for I/O buffers associated with an I/O request 121, and to confirm that the associated data 160 is actually present on disk 122, the modified application 108 calls a routine that waits for the completion of the I/O request 121 represented by an AIOCB 370. Such a routine is typically available in an operating system 110. To ensure that a particular I/O request 121 that is represented by an AIOCB 370 is complete, verification that the I/O operations associated with the AIOCB 370 are complete must occur, as shown in element 2902. Actual I/O operations are represented by one or more IOPARMs 500 that are chained in a linked list from the anchor formed by the combination of IOP 372 and IOPN 374 that are located in the AIOCB 370. In the loop following element 2904 we traverse the entire linked list that is anchored at the IOP 372 and IOPN 374 fields of the AIOCB 370. The local variables J and JN are initialized by setting them to the values of IOP 372 and IOPN 374, respectively, as shown in element 2904. These variables then act as the control variables for the loop. Elements 108, 110, 121, 122, and 160 are described with reference to FIG. 1, elements 370, 372, and 374 are described with reference to FIG. 3, and element 500 is described with reference to FIG. 5.

To ensure that the I/O operations are complete, a current IOPARM 500 is established and checked. The local variables J and JN are used to identify the current IOPARM 500 and IOPARM entry 540, respectively. Access to IOPARM variables 510 and IOPARM entries 540 is based on these variables. Initialization of J and JN is discussed with reference to element 2904. The LOCK 550 and ECB 512 structures are used for serialization and event notification, respectively. The use of these structures in conjunction with operating system 110 services are used to serialize access to an IOPARM 500 and to notify the high-performance improvement code module 112 when an I/O request 121 is complete. LOCK 550 is a structure, which in combination with routines of the operating system 110 serializes access to a computer resource. In particular, LOCK 552 is used to serialize access to the IOPARM 500. That is, a thread of execution that needs access to an IOPARM 500 in order to read or manipulate certain of its elements first "acquires" the LOCK 550 structure of the IOPARM 500 using operating system 110 services. When the thread is done accessing the LOCK 550 structure, it "relinquishes" the LOCK 550 structure. Element 112 is described with reference to FIG. 1, and elements 500, 510, 512, 540, and 550 are described with reference to FIG. 5.

In element 2906 the control variable is tested to see if it has the special value NULL, which indicates that the end of the linked list has been reached. If it does, the IOPARM 500 linked to the AIOCB 370 have been processed and control is returned to the application 108 in element 208. The operation of the Queue Pending Module 224 and the initialization operation performed in element 2904 guarantee that the local variable J will not have the NULL value on the first pass through the loop. The I/O is located using J as shown in element 2924. There are references herein to a symbolic constant, NULL. NULL is a particular value outside the valid range for the fields in question.

Since the operations associated with the present invention may include IOPARM entries 540 that do not represent a complete I/O operation as requested by an AIOCB 370, the field NWAITS 516 is included in the IOPARM 500. Now, moving to element 2912, NWAITS 516 is incremented by one each time wait processing determines that I/O for one of the IOPARM entries 540 is complete. When NWAITS 516 equals NLST 514, we know that the AIOCB 370 processing for an IOPARM 500 is done and that the IOPARM 500 is no longer needed, as shown in element 2916. Element 516 is described with reference to FIG. 5.

The DONE 552 field of the current IOPARM 500 is a flag that indicates whether or not the I/O operation represented by the IOPARM 500 is complete. DONE 552 and other IOPARM 500 variables may be accessed concurrently by other threads doing wait processing or by an I/O completion routine driven by modules of the operating system 110, such as the high-performance direct I/O interface 113. To safely deal with IOPARM variables 510, we first acquire LOCK 550, as shown in element 2926. Then a test is conducted, as shown in element 2928, to determine the value of DONE 552. If DONE 552 is equal to one, I/O represented by the current IOPARM 500 is complete, and the NWAIT 516 variable is incremented, as shown in element 2912. If DONE 552 is equal to zero from the test of element 2928, I/O represented by the current IOPARM 500 is not yet complete and therefore a "wait" on ECB 512 is started, as shown in element 2908. When ECB 512 is "posted" the thread of execution in the Wait for AIOCB Module 273 continues, and DONE 552 is set to one, as shown in element 2910. In both cases, we now know that I/O for the current IOPARM 500 is complete. We then increment NWAITS 516 as shown in element 2912. As shown in element 2914, the IOP 372 and the IOPN 374 fields of the current IOPARM entry 540 are used to locate the IOPARM 500 and IOPARM entry 540 that will be processed next. Since the current IOPARM 500 may be released before the beginning of the next iteration of the loop, we save these values in local variables K and KN, respectively. As shown in element 2916, if NWAITS 516 has reached the value of NLST 514, the waits associated with the IOPARM entries 540 in the IOPARM 500 have been processed. Then LOCK 550 is relinquished, as shown in element 2918, and the I/O elements 302 are moved to the IOPARM 500 free chain, as shown in element 2920. Now that the manipulation and testing of the IOPARM Variables 510 is complete the LOCK 550 is released, as shown in element 2922. Finally, as shown in element 2930, the contents of K and KN are copied to J and JN, respectively, and execution control is transferred to the top of the loop at element 2904. Element 552 is described with reference to FIG. 5.

FIG. 3 represents the data structure of the PRT 300, the parameters 300 and the variables 350 associated with the PRT 300. Each I/O write request 121 is scheduled by transmitting data blocks specified in I/O elements 302 from the PRT 300 to the disk 122. As this is done, the I/O elements 302 are chained to the AIOCB 370 from which they originated. Those skilled in the art will appreciate the operation of chaining I/O elements 302. FIG. 3 includes FIGS. 3A–3G. The elements 121 and 122 are described with reference to FIG. 1.

Figure 3A:
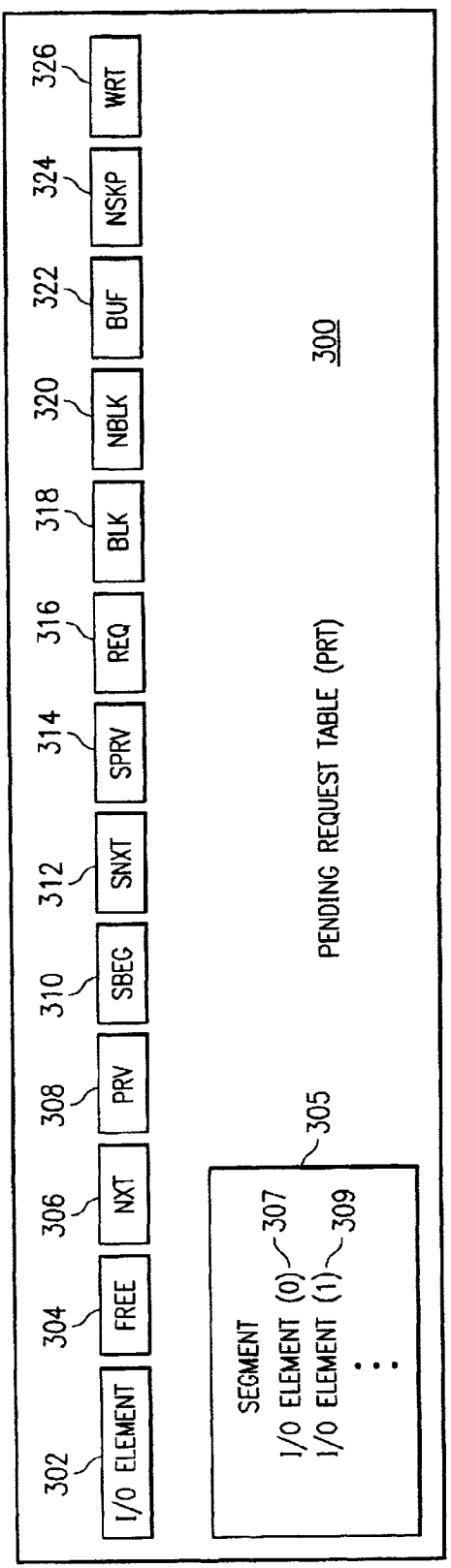
FIG. 3A is a block diagram that illustrates the Pending Request Table.

More particularly, as described in FIG. 3A, the PRT 300 is populated with I/O elements 302 and is central to the operation of the present invention. The PRT 300 keeps track of the I/O requests 121 that have yet to be scheduled for transmission to the disk 122. The PRT 300 is created on a per-file basis. When an I/O element 302 is on the free list, the variable, FREE 304 represents the entry index of the next free table entry. A value of NULL for the variable, FREE 304 indicates that the I/O element 302 is the last entry on the free list. Other fields have no meaning when an entry is on the free list. Those skilled in the art will appreciate the use of the free list with respect to managing data structures while minimizing reliance on computer operating system 110 memory-management routines 125 to provide all memory dynamically. Elements 110, 113, and 125 are described with reference to FIG. 1.

In the preferred embodiment of the present invention, pending I/O elements 302 are kept in the PRT 300 in ascending order by block address 318 in the data file 102. The variables, NXT 306 and PRV 308 are the pointers used to maintain I/O elements 302 in a doubly-linked list in the required order. In the preferred embodiment of the present invention, there are two dummy I/O elements 302, the first I/O element 302 and the last I/O element 302, that are used in the management of the doubly-linked pointers. NXT 306 and PRV 308 contain table index values of the I/O element 302 with the next higher and next lower disk address, respectively. The first I/O element 302, an anchor element has a block address 318 value less than zero. The last I/O element 302, another anchor element, has a block address 318 value that is greater than the value of the variable MAXBLKS 338. With respect to the last I/O element 302, the value of the variable NXT 306 is zero. With respect to the first I/O element 302, the value of the variable, PRV 308 is the value of NPNDMAX 342 plus one. Element 102 is described with reference to FIG. 1.

The variables, SBEG 310, SNXT 312, and SPRV 314 are used to keep track of segments 305. A segment 305 is a set of I/O elements 302 whose extents 123 are contiguous. By definition, even a single I/O element 302 is contained in a segment 305. SBEG 310, SNXT 312, and SPRV 314 are the I/O element 302 indices of the first, next and previous I/O elements 302, respectively, in the same segment 305 with the given I/O element 302. In single-entry segments 305, all three fields have the index value of the given I/O element 302. A segment 305 may have one or more I/O elements 302, such as I/O element(0), as shown in element 307 and I/O element(1) as shown in element 309. Element 123 is described with reference to FIG. 1.

The variable, REQ 316 is the address of the AIOCB 370 that was processed to create the given I/O element 302. The variables, BLK 318, NBLK 320, and BUF 322 represent the block 142 address within the data file 102, the number of blocks 140 to write, and the virtual address of the data 160 prior to transmission to the disk 122, respectively. Element 140, 142, and 160 are described with reference to FIG. 1.

The variable, NSKP 324 is used to track the number of times a given entry was in the PRT 300 when one or more full tracks 140 were scheduled for transmission to the disk 122. I/O elements 302 should not stay in the PRT 300 too long. Leaving an I/O element 302 in the PRT 300 too long may result in serializing on an I/O request 121 made early but not scheduled until later in the transaction. A transaction refers to the I/O requests 121 that may be reordered before their associated waits are issued. The variable, WRT 326 is used to flag I/O elements 302 in the PRT 300 that will be processed by the Process Partial Tracks Module 209 (as shown in FIG. 2J).

Figure 3C:
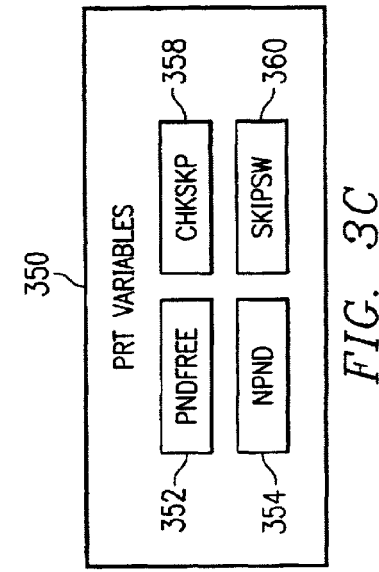
FIG. 3C is a block diagram that illustrates the Pending Request Table Variables.
Figure 3B:
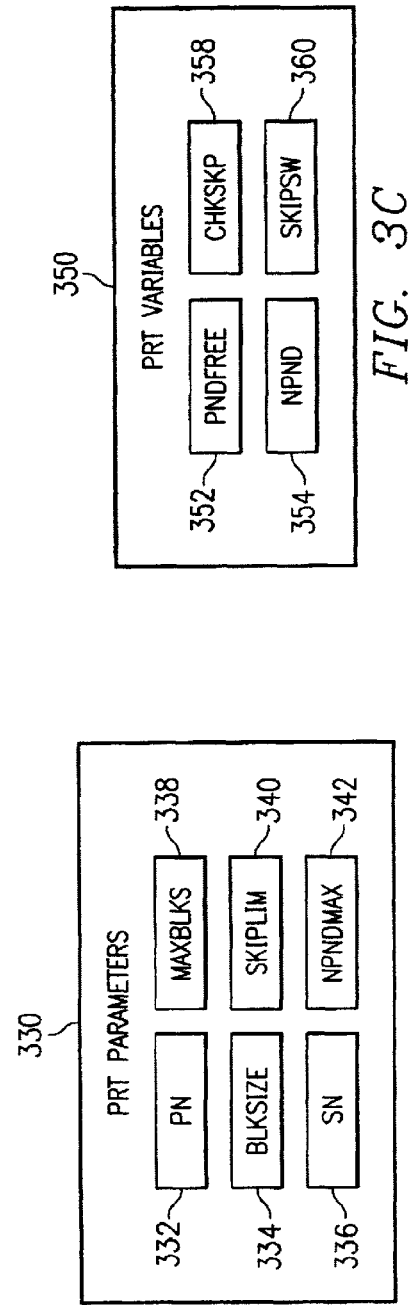
FIG. 3B is a block diagram that illustrates the Pending Request Table Parameters.

FIG. 3B describes the PRT parameters 330 used in the environment in which the PRT 300 operates. The parameter, PN 332, defines the level of I/O transfer parallelism and in the preferred embodiment of the present invention is set to the number of disk paths 132 that are available. In the preferred embodiment of the present invention it is assumed that the value of PN 332 is the same for all files 102. However, it will be appreciated that the value of PN 332 could vary on a per-file basis. The parameter, BLKSIZE 334 represents the size of a block of data 160. It will be appreciated that any value that will fit on a track 140 is an acceptable value for BLKSIZE 334. The parameter, SN 336 represents the number of blocks 142 that fit on a single track 140 of the disk 122. For modern S/390 disks 122, this value is six when the value of BLKSIZE 334 is eight thousand one hundred ninety-two. The parameter, MAXBLKS 338 represents the maximum number of blocks 142 that constitute a data file 102. The parameter, SKIPLIM 340 represents the maximum number of times a pending I/O request 121 can be skipped instead of transferred to the disk 122 during processing of the present invention. In the to preferred embodiment of the present invention this value is three. It will be appreciated that this value may be adjusted based on experimentation to ensure that I/O requests 121 are transmitted in a timely fashion. The elements 102, 122, 132, 140, 142 and 160 are described with reference to FIG. 1.

The preferred embodiment of the present invention uses a fixed-size table for the PRT 300 in order to minimize memory allocation calls and memory deallocation calls. The parameter, NPNDMAX 342 represents the number of actual I/O elements 302 in the PRT 300. In the preferred embodiment of the present invention, NPNDMAX 342 represents the number of I/O elements 302 excluding the first and last I/O elements 302 that act as anchor I/O elements 302. The value of NPNDMAX 340 may be adjusted based on experimentation and should be set so that the PRT 300 is generally available for manipulation of new I/O elements 302. For example, if the Make Room Module 236 is called too often, NPNDMAX 342 should be increased. Element 236 is described with reference to FIG. 2.

FIG. 3C describes the PRT variables 350 that are used to schedule an I/O request 121 according to the operation of the present invention. The variable, PNDFREE 352 is the free list anchor for I/O elements 302. Initially, the I/O elements 302 are queued on this anchor that may be referred to as a dummy I/O element 302. The variable, NPND 354 represents the number of I/O elements 302 that are not on the free list. That is, NPND 354 represents I/O elements 302 that have not yet been scheduled for transmission to the disk 122. The variables, CHKSKP 358 and SKIPSW 360 are boolean flags used to ensure that the first I/O element 302 added to the PRT 300 is scheduled to be written to the disk 122 as soon as the first full track 140 of data 160 is available in a given transaction. Elements 121, 122, 140, and 160 are described with reference to FIG. 1.

Figure 3D:
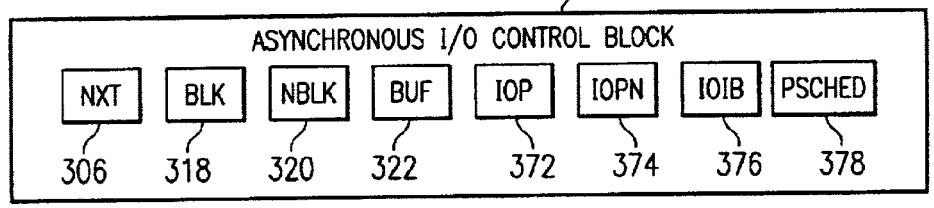
FIG. 3D is a block diagram that illustrates the Asynchronous I/O Control Block.

FIG. 3D describes the AIOCB 370. In the preferred embodiment of the present invention I/O requests 121 are specified by passing the following parameters in an AIOCB 370: a file handle, a buffer address 124, a length value, and a disk address 128. The file handle identifies the file involved in the I/O operation. The buffer address 124 and length identify the area of memory 658 for writing data 160 or holding read data 160. The disk address 128 identifies the location within the file that data 160 is to be written to or read from. The preferred embodiment of the present invention schedules multiple asynchronous I/O requests 121 before the application 108 issues any waits with respect to a single data file 102. However, the present invention is not limited to a single data file 102 but may issue I/O requests 121 to several different data files 102. Elements 102, 108, 121, 124, 128, and 160 are described with reference to FIG. 1, and element 658 is described with reference to FIG. 6.

The AIOCB 370 is a data structure that the high-performance direct I/O interface 113 uses to identify asynchronous I/O requests 121 made from the system-dependent code module 111. The system-dependent code module 111 uses the AIOCB 370 to store values associated with an I/O request 121 and to maintain information necessary to determine the status of the I/O request 121. The variable NXT, 306 is used by the high-performance direct I/O interface 113 to maintain the AIOCB 370 in various queues. The variable, BLK 318 represents the initial block 142 number within the file 102 for the I/O request 121. The variable, NBLK 320 represents the number of blocks 142 to be transferred. The variable, BUF 322 is the address of the memory 658 area involved in the I/O operation. On the IBM S/390 block 142 addresses are zero-based and a track 140 holds six blocks 142. Elements 111, 113, 140, and 142 are described with reference to FIG. 1.

The variables, IOP 372 and IOPN 374 represent a two-part pointer to the data structure, IOPARM 500. The variable, IOP 372 represents the address of the first IOPARM 500 used to schedule I/O requests 121 for the current AIOCB 370. The variable, IOPN 374 represents the index of the IOPARM entry 540 within that IOPARM 500. The elements 500 and 540 are described with reference to FIG. 5.

The file handle is used to locate an information block that typically contains information used by the high-performance direct I/O interface 113 and the I/O system 114 to schedule I/O requests 121. Those skilled in the art will appreciate the operation of the file handle. Unlike other I/O request 121 parameters, in the preferred embodiment of the present invention, the file handle is not kept in the AIOCB 370. Instead, the variable IOIB 376 contains the address of an information block used by the high-performance improvement code module 112 to maintain information about a data file 102, including the file handle. Element 114 is described with reference to FIG. 1.

In the preferred embodiment of the present invention, it is assumed that I/O requests 121 that are part of the same transaction do not overlap on the disk 122 and consequences of a failure to satisfy this assumption can be severe. So, in order to validate the assumption, information about which extents 123 were written to during a transaction are recorded in the EVT 400. Element 123 is described with reference to FIG. 1, and element 400 is described with reference to FIG. 4.

The variable, PSCHED 378 (as shown in FIG. 3) is a boolean flag indicating whether or not the I/O request 121 for this AIOCB 370 should be scheduled using the operation of the present invention.

As shown in Table 1 below, and for purposes of further explanation, a single extent 123 from an AIOCB 370 can result in one, two or three I/O elements 302 to add to the PRT 300. In this example, it is assumed that there are six blocks 142 per track 140, and that block numbers are zero-based. The entries of Table 1 show how I/O requests 121 of varying lengths, and varying starting and ending positions with respect to track 140 boundaries, can be split so that partial-track portions are separated from full-track portions and from each other. For example, in Row 3 of Table 1, the block address, BLK 318, is three. The number of blocks to be written, NBLK 320, is seven. In this case, the track 140 boundary is between blocks 142 five and six (because block 142 addresses are zero-based and a track 140 holds six blocks 142). Therefore, the initial block address, BLK 318, for the first I/O element 302 is three and it is three blocks 142 in length. The initial block address, BLK 318, of the second I/O element 302 is six, and it is four blocks in length.

Figure 3E:
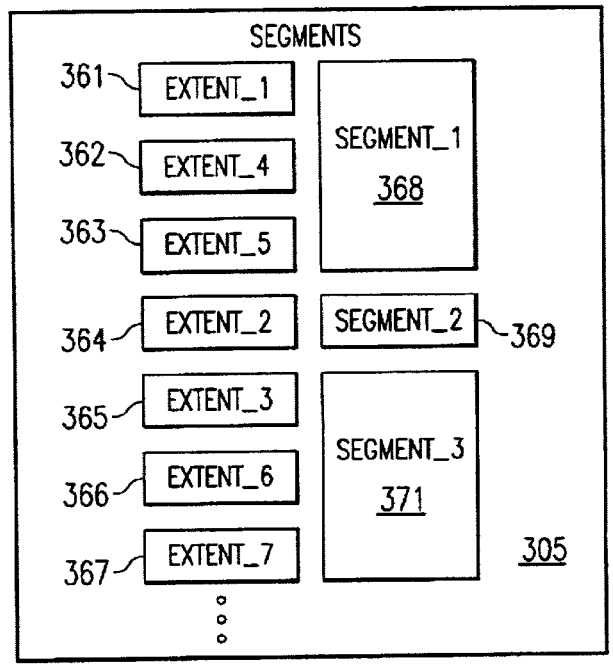
FIG. 3E is a block diagram that illustrates segments.
Figure 3F:
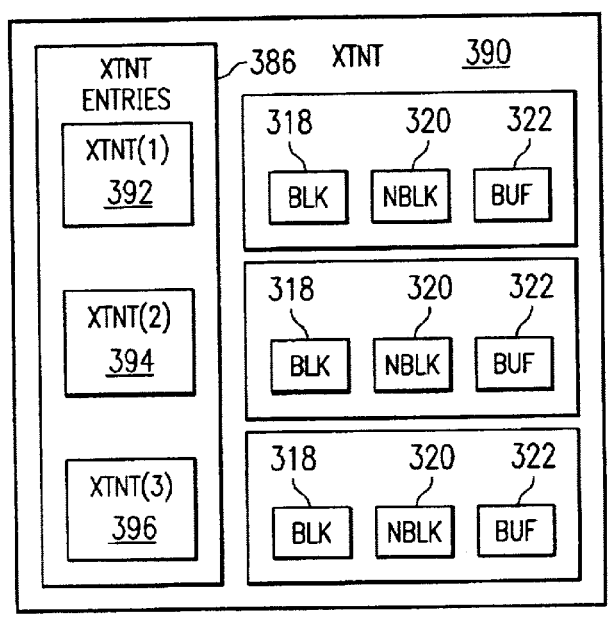
FIG. 3F is a block diagram that illustrates the XTNT Structure.

FIG. 3F describes the XTNT Structure 390. XTNT 390, as used in the preferred embodiment of the present invention, is an array that includes information for creating three extents 123. Since it is possible to create three I/O elements 302 from an I/O request 121 as is discussed in detail with respect to FIG. 2C and FIG. 2D, there are IS three entries in the XTNT array 386. They are XTNT(1), as shown in element 392, XTNT(2), as shown in element 394, and XTNT(3), as shown in element 396. Each XTNT entry includes a block address, BLK 318, a number of blocks to be transferred, NBLK 320, and a buffer size, BUF 322. The XTNT array 390 describes how an extent 123 described in an AIOCB 370 is to be split into as many as three extents 123 in order to create as many as three I/O elements 302 in a PRT 300. Elements 121 and 123 are described with reference to FIG. 1.

Figure 3G:
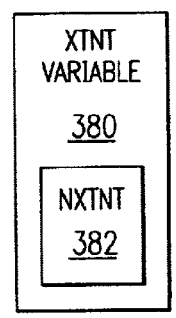
FIG. 3G is a block diagram that illustrates the XTNT Variable.

FIG. 3G is a block diagram that illustrates the variable associated with the XTNT array 390. The XTNT Variable 380 includes NXTNT 382, which represents the number of extents 123 that need to be queued, and is described with respect to FIG. 2C. Element 123 is described with reference to FIG. 1.

FIG. 4 includes FIGS. 4A–4C.

FIG. 4A describes the Extent Validation Table (EVT) 400. The EVT 400 includes information necessary to issue I/O requests 121 according to the operation of the present invention and is created on a per-file basis. EVT entries 426 in the EVT 400 are kept in the table in ascending order by block address 318. The variable, NXT 306 is the circular link pointer used to maintain the I/O elements 302 in the required order and contains the table index value of the I/O

TABLE 1

Splitting an AIOCB into I/O Elements:

| Table Row | Block Number | Number of Blocks | Block Number of First I/O Element | Number of Blocks in First I/O Element | Block Number of Second I/O Element | Number of Blocks in Second I/O Element | Block Number of Third I/O Element | Number of Block in Third I/O Element |
|---|---|---|---|---|---|---|---|---|
| 1 | 3 | 2 | 3 | 2 | | | | |
| 2 | 6 | 18 | 6 | 18 | | | | |
| 3 | 3 | 7 | 3 | 3 | 6 | 4 | | |
| 4 | 12 | 15 | 12 | 12 | 24 | 3 | | |
| 5 | 14 | 13 | 14 | 4 | 18 | 6 | 24 | 3 |

FIG. 3E describes segments 305. The extents 123 that are in order are combined to create a segment 305. Segments 305 are used to simplify the task of determining how to partition I/O elements 302 into extents 123 and then how to align the extents 123 along track 140 boundaries. Therefore, as shown in FIG. 3E and for the purposes of explanation, extent_1, as shown in element 361, extent_4, as shown in element 362, and extent_5, as shown in element 363 are combined to create segment_1, as shown in element 368. Further, extent_2, as shown in element 364, was created at a time when there were no other extents 123 that could be combined. Therefore extent_2, as shown in 364, is used to create segment_2, as shown in element 369. Finally, extent_3, as shown in element 365, extent_6, as shown in element 366, and extent_7, as shown in element 367 are combined to create segment_3, as shown in element 371. Elements 123 and 140 are described with reference to FIG. 1.

element 302 with the next higher disk address 128. When an EVT entry 426 is on the free list, the variable, NXT 306 has the entry index of the next free EVT entry 426. A value of NULL for NXT 306 indicates that the EVT entry 426 is the last EVT entry 426 on the free list. Other fields in the EVT 400 have no meaning when an entry is on the free list. The variables, BLK 318 and NBLK 320 have the block address and the number of blocks 142, respectively, for an extent 123 of blocks 142 for I/O requests 121 associated with the current transaction. In the preferred embodiment of the present invention, the EVT 400 is expected to contain relatively few entries. New I/O requests 121 are expected to often be contiguous with previous I/O elements 302. When this happens, existing EVT entries 426 are expanded or merged to reflect the consolidated effect of all EVT entries 426 for the current transaction. Elements 102, 121, 123, 128, and 142 are described with reference to FIG. 1.

FIG. 4B describes the EVT Parameters 410. The variable, NVALMAX 412 represents the number of EVT entries 426, excluding the anchor EVT entry 426, in the EVT 400. This value should be as large as the maximum number of I/O requests 121 that could be issued in a single transaction. Those skilled in the art will appreciate that the technique described herein, a circular list, is exemplary and other techniques may be practiced without departing from the spirit of the present invention. The preferred embodiment of the present invention does not provide a recovery mechanism if the EVT 400 fills up. NVALMAX 412 should be set to a sufficiently large number to ensure that the EVT 400 does not fill up. If a reasonable value for NVALMAX 412 cannot be ascertained, standard techniques may be used to make the EVT 400 capable of growing, rather than fixed in size, without deviating from the invention.

FIG. 4C describes the EVT Variables 420 that may be added to the information block that typically contains information used by the high-performance direct I/O interface 113 and the I/O subsystem 114, to schedule I/O requests 121 for a particular file 102. The variable, VALFREE 422 is the free list anchor for EVT entries 426. The variable, NVAL 424 represents the number of EVT entries 426 that are not on the free list. All such EVT entries 426 are associated with write requests that have been made during the current transaction. Elements 102, 113, 114, and 121 are described with reference to FIG. 1.

Figure 5A:
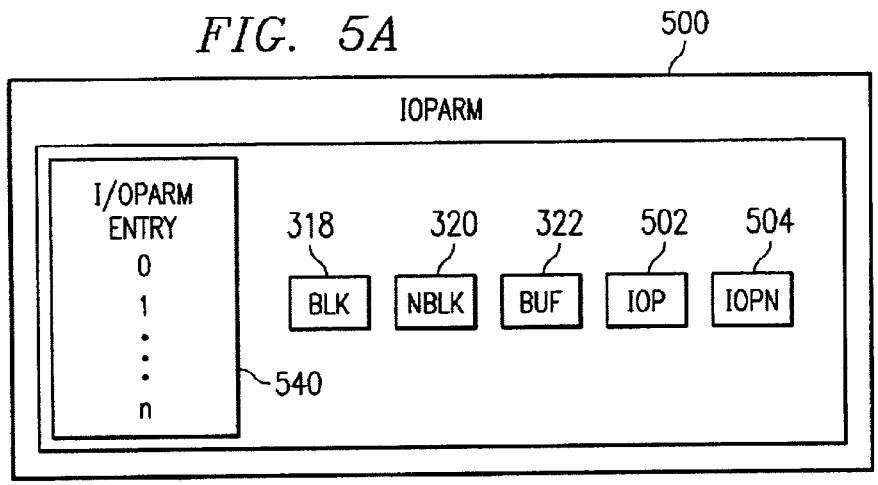
FIG. 5A is a block diagram that illustrates the IOPARM.
Figure 5C:
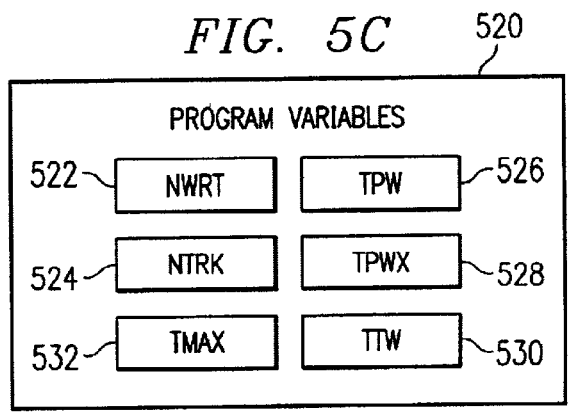
FIG. 5C is a block diagram that illustrates the Program Variables.

FIG. 5 includes FIGS. 5A–5C.

FIG. 5A describes the IOPARM 500 data structure that represents a single I/O request 121 to be scheduled for transmission to the disk 122. In some cases, an embodiment of the invention divides a single I/O request 121 from an AIOCB 370 into as many I/O elements 302 as two more than the number of parallel disk paths 132 and schedules them in as many different IOPARMs 500. Therefore, to complete transmission of I/O requests 121, a number of IOPARMs 500 may need to be checked. To make this possible, the AIOCB 370 is linked to the IOPARMs 500 used to write the data 160 specified in the AIOCB 370. An IOPARM 500 consists of a number of scalar fields and a table with rows of IOPARM entries 540. In the preferred embodiment of the present invention, there are SN 336 number of rows, so that a full-track write can be scheduled with a single IOPARM 500 that might be associated with SN 336 separate AIOCBs 370.

Elements 121, 122, 132, and 160 are described with reference to FIG. 1 and elements 302, 336, and 370 are described with reference to FIG. 3.

Each IOPARM entry 540 in the IOPARM 500 has the following fields. The variable, BLK 318, represents the block address within the file 102 where data 160 is to be written. The variable, NBLK 320, represents the number of blocks 142 to be written. The variable, BUF 322, represents the buffer address 124. The variable, IOP 502, represents the location of the IOPARM 500 with the next I/O element 302 associated with the same AIOCB 370 as the current I/O element 302. The variable IOPN 504 represents the IOPARM entry index in the IOPARM 500 addressed by IOP 502 that contains the next IOPARM entry 540 associated with the same AIOCB 370 as the current IOPARM element 540. A value of NULL for the IOP 502 indicates the current I/O element 302 is the last. Elements 102, 124, and 142 are described with reference to FIG. 1.

FIG. 5B describes the IOPARM Variables 510. The variable, NXT 306, is the chain field for the IOPARM 500. The variable, ECB 512, is the event control block that is posted when the I/O request 121 scheduled for the IOPARM 500 is complete. The variable LOCK 550 in combination with routines of the operating system 110 serializes access to a computer resource. The variable DONE 552 is a flag that indicates whether or not the I/O operation represented by the IOPARM 500 is complete. The variable NLST 514 represents the number of IOPARM entries 540 in use. The variable NWAITS 516 represents the number of I/O waits processed for this IOPARM 500. When the value of NWAITS 516 reaches the value of NLST 514, the IOPARM 500 can be returned to the free list. Those skilled in the art will appreciate the use of I/O waits and the event control block that is posted. Elements 110 and 121 are described with reference to FIG. 1.

The disclosed embodiment of the present invention has focused on optimizing long sequences of I/O requests 121 that are issued asynchronously before issuing any waits. However, medium and large synchronous I/O requests 121 can also take advantage of the disclosed invention. Instead of simply creating a single IOPARM 500 for each synchronous I/O request 121, the I/O request 121 may be divided into as many as PN 332 parts while being careful to divide I/O requests 121 on track 142 boundaries. Then the as many as PN 332 IOPARMs 500 may be created and scheduled. Element 142 is described with reference to FIG. 1, and element 332 is described with reference to FIG. 3.

FIG. 5C describes the program variables 520 that are used by the preferred embodiment of the present invention. The variable NTRK 524 is set to the number of tracks 140 spanned by the current segment 305. The variable NWRT 522 is set to the minimum of NTRK 524 and PN 332. The operation of NTRK 524 and NWRT 522 are described with reference to FIG. 2G. Element 140 is described with reference to FIG. 1, and elements 305 and 332 are described with reference to FIG. 3.

The variable TPW 526 is described with respect to FIG. 2G. The variable, TPW 526 is set to the integer portion and the variable TPWX 528 is set to the remainder portion of the quotient that results from dividing NTRK 524 by NWRT 522. The variable TTW 530 is a counter variable used in the operation of the Write Segment Module 230 and is described with reference to FIG. 2G. The variable, TMAX 532, represents the largest I/O request 121 that can be efficiently handled.

The operation of the present invention is further described by an example that follows. More particularly, the following example shows how the contents of the disclosed data structures change as a small I/O request 121 is processed. The following parameters are used in this example as shown in Table 2, Parameters. Element 121 is described with reference to FIG. 1.

TABLE 2

| Parameters: | |
|---|---|
| Parameters: | Value of Parameter: |
| TRACK SIZE IN BLOCKS, SN: | 6 |
| BLOCK SIZE, BLKSIZE | 8 |
| LEVEL OF PARALLELISM OF DISK, PN | 2 |
| PENDING TABLE SIZE, NPNDMAX | 26 |
| SKIP LIMIT, SKPLIM | 3 |

At the beginning of a transaction, the EVT 400 and the PRT 300 are both empty, and the non-anchor EVT entries 426 and I/O elements 302 are on the free list. To make the example more readable, only table entries that are not on the free list are shown. No AIOCBs 370 or IOPARMs 510 are allocated at this point. Elements 300 and 302 are described with reference to FIG. 3, and element 426 is described with reference to FIG. 4.

The first I/O request 121 contains the parameters, as shown in Table 3.

TABLE 3

Parameters of the First I/O Request in the AIOCB:

| KEY | BLK | NBLK | BUF | IOP | IOPN |
|-----|-----|------|-----|-----|------|
| RQ1 | 2 | 3 | 0 | NULL | NULL |

A particular AIOCB 370 is identified by use of a key value, such as RQ1 in this case. In the preferred embodiment of the present invention, this key value is the address in memory of the AIOCB 370. To further simplify the example, buffer addresses, BUF 322 are given in units of 1024 bytes and are relative to the beginning of an area of memory 658 allocated for holding I/O buffers. The example buffer address for each I/O request 121 immediately follows the last byte of the buffer for the previous I/O request 121. This need not be the case in the actual operation of the disclosed method. Elements 322 and 370 are described with reference to FIG. 3, and element 658 is described with reference to FIG. 6.

The requested extent 123 is added to the EVT 400, as shown in Table 4.

TABLE 4

EVT for First I/O Request:

| ROW | NXT | BLK | NBLK |
|-----|-----|-----|------|
| 0 | 1 | 999999 | 0 |
| 1 | 0 | 2 | 3 |

Since this is the first I/O request 121, there is no overlap and the current request is the only extent 123 in the EVT 400. The extent 123 of the current I/O request extent 123 is contained entirely within a track 140, so it is added to the PRT 300 as a single I/O element 302. Elements 123 and 140 are described with reference to FIG. 1, and element 400 is described with reference to FIG. 4.

The contents of the PRT 300 after the first I/O request 121 are shown in Table 5.

TABLE 5

Contents of PRT after First I/O Request:

| ROW | FREE | NXT | PRV | SBEG | SNXT | SPRV | REQ | BLK | NBLK | BUF | NSKP | WRT |
|-----|------|-----|-----|------|------|------|-----|-----|------|-----|------|-----|
| 0 | NULL | 1 | 27 | NULL | NULL | NULL | NULL | -999,999 | 0 | NULL | 0 | 0 |
| 1 | NULL | 27 | 0 | 1 | 1 | 1 | RQ1 | 2 | 3 | 0 | 2 | 0 |
| 27 | NULL | 0 | 1 | NULL | NULL | NULL | NULL | 999,999 | 0 | NULL | 0 | 0 |

Because this is the first I/O request 121 of the transaction, NSKP 324 is set to SKPLIM 340 minus one, which equals two. Whenever an I/O operation is scheduled, NSKP 324 is incremented by one in the I/O elements 302 remaining in the PRT 300. It is now ensured that the first I/O element 302 in the PRT 300 will appear aged when the first I/O operation is scheduled. This fulfills the assumption that if this first segment 305 doesn't become part of a full-track I/O request 121 nearly immediately, the "missing" blocks 142 in its track 140 may have been part of an I/O operation at the end of the previous transaction. Since it is fairly likely that this I/O request 121 will be the first one that is being waited for, it is not recommended to delay by waiting for I/O requests 121 to write blocks 140 that are less likely to arrive. Element 324 and 340 are described with reference to FIG. 3.

The use of NXT 306 and PRV 308 in this table will be appreciated by those skilled in the art as a standard way to handle a doubly-linked list. Note that NXT 306 and PRV 308 point to the ending and beginning anchor entries, 27 and 0, respectively. This is the correct state for the only entry in the PRT 300. Also, SBEG 310, SNXT 312, and SPRV 314 all point to the newly added I/O element 302. Because SBEG 310 points at the current I/O element 302, it is the first entry in the current segment 305. SNXT 312 and SPRV 314 also point at the current I/O element 302 because there is no next entry or no previous entry, respectively, in the segment 305. Because the segment 305 that the current request belongs to does not span at least one full track 140, there is no additional processing of the first I/O request 121 at this point.

Another example shows the result of applying the present invention to a sequence of four I/O requests 121 as represented by four AIOCBs 370. The parameters for this example described with reference to Table 2, Parameters. The result of applying the present invention to the example AIOCBs 370 is a sequence of scheduled I/O requests 121 as represented by six IOPARMs 500.

Table 6, A Sequence of Four AIOCBs, illustrates the contents of the four example AIOCBs 370 at the end of the collecting 250, regrouping 251, and issuing 253 operations of the present invention. To identify the requests, Table 6 contains a column labeled KEY, in which a unique identifier, such as RQ1, is shown for each request. Elements 250, 251, and 253 are described with reference to FIG. 2.

TABLE 6

A Sequence of Four AIOCBs:

| KEY | BLK | NBLK | BUF | IOP | IOPN |
|-----|-----|------|-----|-----|------|
| RQ1 | 2 | 3 | 0 | IO2 | 1 |
| RQ2 | 9 | 10 | 24 | IO4 | 1 |
| RQ3 | 5 | 4 | 104 | IO6 | 1 |
| RQ4 | 19 | 27 | 136 | IO6 | 2 |

Table 7, A Sequence of Six IOPARMs, illustrates the contents of the six IOPARM structures 500 that result from applying the present invention to the requests shown in Table 6. Again, the KEY column is used to provide a unique identifier, such as IO1, for each IOPARM 500. In this example the identifiers in both tables 6 and 7 are used in place of computer memory 658 addresses. Although an IOPARM 500 contains a number of scalar fields, as shown in FIG. 5B, only the fields of the IOPARM table entries 540 are shown in Table 7 and discussed with respect to this example.

TABLE 7

A Sequence of Six IOPARMs:

| KEY | ROW | BLK | NBLK | BUF | IOP | IOPN |
|-----|-----|-----|------|-----|------|------|
| IO1 | 1 | 12 | 6 | 48 | NULL | NULL |
| IO2 | 1 | 2 | 3 | 0 | NULL | NULL |
| IO3 | 1 | 6 | 3 | 112 | NULL | NULL |
|     | 2 | 9 | 3 | 24 | IO1 | 1 |
| IO4 | 1 | 18 | 1 | 96 | IO3 | 2 |
|     | 2 | 19 | 5 | 136 | NULL | NULL |
|     | 3 | 24 | 6 | 176 | IO4 | 2 |
| IO5 | 1 | 30 | 12 | 224 | IO4 | 3 |
| IO6 | 1 | 5 | 1 | 104 | IO3 | 1 |
|     | 2 | 42 | 4 | 320 | IO5 | 1 |

Table 7 illustrates how an application 108 I/O request 121 is transformed by the presents invention, and may be understood by following the chain of I/O requests 121 associated with a given AIOCB 370. Scheduled I/O requests 121 are represented by one or more IOPAEMs 500 chained in a linked list from the anchor associated with the IOP 502 and the IOPN 504 the AIOCB 370.

The first I/O request 121, labeled RQ1, was transformed as follows. Start at the IOP 502 field of the AIOCB 370. In AIOCB 370 RQ1 the value of IOP 502 is IO2. This means that part of I/O request 121 RQ1 was scheduled in the IOPARM 500 identified by key IO2. In AIOCB 370 RQ1 the value of IOPN 504 is 1. This means that part of request 121 RQ1 was scheduled in IOPARM entry 540 number 1 of the located IOPARM 500, IO2. To determine if more than one IOPARM entry 540 was used to schedule I/O for AIOCB 370 RQ1, examine the IOP 502 field of the current IOPARM entry 540, (IO2, 1). It will be appreciated that the notation (IO2,1) refers to the IOPARM entry 540 number 1 in the IOPARM 500 identified by key IO2. The indicated IOP 502 value is NULL, which means that the IOPARM entry 540 chain has ended. Examination of the extent 123 specified in AIOCB 370 RQ1 shows that the BLK 318 and NBLK fields 320 contain the values 2 and 3, respectively. Comparison with IOPARM entry 540 (IO2, 1) shows that the AIOCB 370 and IOPARM entry 540 refer to the same extent 123. When the I/O request 121 scheduled for the IOPARM 500 with key IO2 is complete, all I/O operations requested in AIOCB 370 RQ1 will be complete. In this case there is a one-to-one correspondence between an AIOCB 370 and an IOPARM 500. Operations may be as simple as this example, but may also be more complicated as will be shown with respect to the fourth I/O request 121.

The fourth I/O request 121, labeled RQ4, was transformed as follows. The chain of IOPARM entries 540, starting with the IOP 502 and IOPN 504 fields of the AIOCB 370 initiate the transformation of the fourth I/O request 121. They locate IOPARM entry 540 (IO6, 2). The IOP 502 and IOPN 504 fields of IOPARM entry 540 (IO6, 2) locate the IOPARM entry 540 (IO5, 1). The IOP 502 and IOPN 504 fields of IOPARM entry 540 (IO5, 1) locate the IOPARM entry (IO4, 3). The IOP 502 and IOPN 504 fields of IOPARM entry 540 (IO4, 3) locate the IOPARM entry (IO4, 2). The IOP 502 and IOPN 504 fields of IOPARM entry 540 (IO4, 2) contain the special value NULL, indicating that the IOPARM entry 540 chain ends at this IOPARM entry 540. In this case, the I/O request 121 identified in AIOCB 370 RQ4 is associated with four IOPARM entries 540 in three IOPARMs 500 that were used to schedule the requested I/O operations. Also, note that two of the IOPARMs 500 include IOPARM entries 540 for other AIOCBs 370. It may be verified that the extent 123 specified in the AIOCB 370 [19, 27] is the same extent 123 covered by the extents 123 specified in the IOPARM entry 540 chain [42, 4], [30, 12], [24, 6], and [19, 5]. The notation AIOCB 370 [19,27] means the extent 123 with 27 blocks in length and that begins at block 19.

Examination of the IOPARM entries 540 in Table 7 shows that the I/O request 121 specified in AIOCB 370 RQ4 spans parts of five tracks 140. The partial-track portion near the beginning [19, 5] was aggregated with the I/O request 121 specified in AIOCB 370 RQ2. As a result, two I/O operations 121, as specified in IOPARMs 500 IO4 and IO5, that span two tracks 140 each, were scheduled. Normally, these two IOPARMs 500 would be scheduled and executed concurrently on a system with a level of parallelism, PN 332, of 2. The partial-track portion, [42, 4] following the final track 140 boundary is scheduled along with another extent 123 left over when Process Flush 206 was called. Element 206 is described with reference to FIG. 2.

FIG. 6 is a block diagram of an exemplary computer system 600, suitable for employment of the present invention. The computer system 600 may be implemented on a general-purpose computer, such as the IBM S/390®, or other conventional minicomputers, workstations, or graphics computer devices. In its preferred embodiment, the computer system 600 includes a user input device 610, a display 615, a printer 620, a central processor 655, a memory 658, a data storage device 122, such as a hard drive, an expanded storage, 641, a central storage 640, storage media 630, a storage media interface 635, a data transmission device 645, all of which are coupled to a bus 625 or other communication means for communicating information. The central storage 640 is directly addressable by the central processor 655. The expanded storage 641 may be used to relieve the central storage 640 when it is heavily utilized. Although the system 600 is represented herein as a standalone system, it is not limited to such, but instead can be part of a networked system. For example, the exemplary computer system 600 may be connected locally or remotely to fixed or removable data storage devices 122 and data transmission devices 645. For another example, the exemplary computer system 600, such as the computer system 100, also could be connected to other computer systems via the data transmission devices 645. Element 100 is described with reference to FIG. 1.

The central storage 640, the expanded storage 641, and the data storage device 122 are storage components that store data 160 (as shown in FIG. 1) and instructions for controlling the operation of the central processor 655, which may be configured as one or more processors. The processor 655 executes a program 642 to perform the methods of the present invention, as described herein. Before processing occurs, a program 642 and its data 160 must reside in the central storage 640. Input/Output operations result in the transfer of information between the central storage 640 and user input device 610.

While the program 642 is indicated as loaded into the memory 658, it may be configured on storage media 630 for subsequent loading into the data storage device 122, or the memory 658 via an appropriate storage media interface 635. Storage media 630 can be any conventional storage media such as a magnetic tape, or an optical storage media. Alternatively, storage media 630 can be another type of electronic storage, located on a remote storage system.

Generally, the computer programs 642 and operating systems 110 (as shown in FIG. 1) are all tangibly embodied in a computer-readable device or media, such as the memory 658, the data storage device 122, or the data transmission devices 645, thereby making an article of manufacture, such as a computer program product, according to the invention. As such, the terms "computer program product" as used herein are intended to encompass a computer program accessible from any computer readable device or media.

Moreover, the computer programs 642 and operating systems 110 are comprised of instructions which, when read and executed by the exemplary computer system 600, such as the computer system 100, perform the steps necessary to implement and use the present invention. Under control of the operating system 110, the computer programs 642 may be loaded from the memory 658, the data storage device 122, or the data transmission devices 645 into the memory 658 of the exemplary computer system 600, such as the computer system 100.

User input device 610 is a device, such as a keyboard or speech recognition subsystem, for enabling a user to communicate information and command selections to the central processor 655. The user can observe information generated by the system 600 via the display 615 or the printer 620. The user input device 610 may also be a mouse, track-ball, or joy stick, that allows the user to manipulate a cursor on the display 615 for communicating additional information and command selections to the central processor 655.

When operating in accordance with one embodiment of the present invention, the exemplary computer system 300 collects, regroups, and issues I/O requests 121 that improve I/O throughput by taking advantage of the high-performance features of the Shark® disk 122. The central processor 655 and the program 642 collectively operate to improve the performance of I/O disk access. It will be appreciated that the present invention offers many advantages over prior art techniques. Element 121 is described with reference to FIG. 1.

The present invention is typically implemented using one or more computer programs, each of which executes under the control of an operating system 110 and causes the exemplary computer system 600, such as the computer system 100, to perform the desired functions as described herein. Thus, using the present specification, the invention may be implemented as a machine, process, method, system, or article of manufacture by using standard programming and engineering techniques to produce software, firmware, hardware or any combination thereof.

It should be understood that various alternatives and modifications can be devised by those skilled in the art. For instance, the disclosed embodiment of the present invention focuses on scheduling writes. If a system's design calls for it to issue long sequences of reads asynchronously, the present invention may also be applied to such sequences of reads. However, these alternatives and modifications should not be viewed as limitations upon the practice of these teachings, as those skilled in the art, when guided by the foregoing teachings, may derive other suitable characteristics of a similar or different nature. The present invention is intended to embrace all such alternatives, modifications and variances that fall within the scope of the appended claims Trademarks IBM is a trademark or registered trademark of International Business Machines, Corporation in the United States and other countries.

S/390 is a trademark or registered trademark of International Business Machines, Corporation in the United States and other countries.

OS/390 is a trademark or registered trademark of International Business Machines, Corporation in the United States and other countries.

IBM Shark is a trademark or registered trademark of International Business Machines Corporation in the United States and other countries.

Unix is a trademark or registered trademark of Unix System Laboratories, Inc.

We claim:

1. A computer-implemented method for issuing I/O requests, said computer having a disk with a parallel access volume, at least one file including said I/O requests, and at least one application executing on said computer, the method comprising:

accessing said file by said application;

collecting said I/O requests by said application;

regrouping said I/O requests by said application; and issuing said I/O requests to said disk concurrently by said application thereby taking advantage of said parallel access volume.

2. The computer-implemented method of claim 1, the method further comprising:

determining an optimal number of said issued I/O requests; and issuing said optimal number of I/O requests to said disk via said parallel access volume.

3. The computer-implemented method of claim 1, the method further comprising:

determining an optimal order of said issued I/O requests; and issuing said optimal order of I/O requests to said disk via said parallel access volume.

4. The computer-implemented method of claim 1, the method further comprising determining an optimal number of said issued I/O requests; and issuing said optimal number of I/O requests to said disk on track boundaries.

5. The computer-implemented method of claim 1, the method further comprising:

accessing data in said computer; and associating said data with said issued I/O request.

6. The computer-implemented method of claim 1, the method further comprising:

including an operating system in said computer; and minimizing use of memory-management calls of said operating system by said collecting, said regrouping, and said issuing.

7. The computer-implemented method of claim 1, the method further comprising:

said collecting I/O requests comprising:

breaking said I/O requests into track-aligned I/O elements; and determining when said I/O elements should be issued.

8. The computer-implemented method of claim 7, the method further comprising said issuing said I/O requests to said disk by writing at least one said track-aligned I/O element to said disk.

9. The computer-implemented method of claim 7, the method further comprising said issuing said I/O requests to said disk by writing at least one said non-track aligned I/O element to said disk if a threshold is exceeded.

10. The computer-implemented method of claim 1, wherein said application is a database.

11. A computer-implemented method for issuing I/O requests, said computer having a disk with a parallel access volume, at least one file including said I/O requests, and at least one application executing on said computer, the method comprising:

accessing said file by said application;

collecting said I/O requests by said application further comprising:

breaking said I/O requests into track-aligned I/O elements; and determining when said I/O elements should be issued;

regrouping said I/O requests by said application; and issuing said I/O requests to said disk concurrently by said application and by writing at least one said track-aligned I/O element to said disk thereby taking advantage of said parallel access volume.

12. The computer-implemented method of claim 11, further comprising:

accessing data in said computer; and associating said data with said issued I/O request.

13. A computer system for issuing I/O requests, said computer having a disk with a parallel access volume, at least one file including said I/O request, and at least one application executing on said computer, comprising:

said file that is accessed by said application;

collected said I/O requests by said application;

regrouped said I/O requests by said application; and said I/O requests being issued to said disk currently by said application thereby taking advantage of said parallel access volume.

14. The computer system of claim 13, further comprising an optimal number of said issued I/O requests.

15. The computer system of claim 13, further comprising an optimal order of said issued I/O requests.

16. The computer system of claim 13, further comprising an optimal number of said issued I/O requests that are issued to said disk on track boundaries.

17. The computer system of claim 13, further comprising data included in said computer and said data is associated with said issued I/O request.

18. The computer system of claim 13, further comprising:

an operating system in said computer; and memory-management calls of said operating system being minimized by said collected I/O requests, said regrouped I/O requests, and said issued I/O requests.

19. The computer system of claim 13, further comprising:

said collected I/O requests that are broken into track-aligned I/O elements; and said I/O elements that are identified when to be issued.

20. The computer system of claim 19, further comprising said issued said I/O requests comprising said track-aligned I/O element that is written to said disk.

21. The computer system of claim 19, further comprising said issued said I/O requests comprising said non-track aligned I/O element that is written to said disk if a threshold is exceeded.

22. The computer system of claim 13, wherein said application is a database.

23. A computer system for issuing I/O requests, said computer having a disk with a parallel access volume, at least one file including said I/O requests, and at least one application executing on said computer, comprising:

said file that is accessed by said application;

collected said I/O requests by said application;

said collected I/O requests that are broken into track-aligned I/O elements;

said I/O elements that are identified when to be issued;

regrouped said I/O requests by said application; and said I/O requests being issued to said disk concurrently by said application and by writing at least one said track-aligned I/O element to said disk thereby taking advantage of said parallel access volume.

24. The computer system of claim 23, further comprising data included in said computer and said data is associated with said issued I/O request.

25. An article of manufacture comprising a program storage medium readable by a computer and embodying one or more instructions executable by said computer for causing a computer to issue I/O requests, said computer having a disk with a parallel access volume, at least one file including said I/O requests, and at least one application executing on said computer, wherein:

computer-readable program code accesses said file by said application;

computer-readable program code collects said I/O requests by said application;

computer-readable program code regroups said I/O requests by said application; and computer-readable program code issues said I/O requests to said disk concurrently by said application thereby taking advantage of said parallel access volume.

26. The article of manufacture of claim 25, wherein:

computer-readable program code determines an optimal number of said issued I/O requests; and computer-readable program code issues said optimal number of I/O requests to said disk via said parallel access volume.

27. The article of manufacture of claim 25, wherein:

computer-readable program code determines an optimal number of said issued I/O requests; and computer-readable program code issues said optimal number of I/O requests to said disk on track boundaries.

28. The article of manufacture of claim 25, wherein:

computer-readable program code determines an optimal order of said issued I/O requests; and computer-readable program code issues said optimal order of I/O requests to said disk via said parallel access volume.

29. The article of manufacture of claim 25, wherein:

computer-readable program code accesses data in said computer; and computer-readable program code associates said data with said issued I/O request.

30. The article of manufacture of claim 25, wherein:

computer-readable program code includes an operating system in said computer; and computer-readable program code minimizes use of memory-management calls of said operating system by said collecting, said regrouping, and said issuing.

31. The article of manufacture of claim 25, wherein:

said computer-readable program code collects said I/O requests, and further wherein: computer-readable program code breaks said I/O requests into track-aligned I/O elements; and computer-readable program code determines when said I/O elements should be issued.

32. The article of manufacture of claim 31, wherein said computer-readable program code issues said I/O requests by writing at least one said track-aligned I/O element to said disk.

33. The article of manufacture of claim 31, wherein said computer-readable program code issues said I/O requests by writing at least one said non-track aligned I/O element to said disk if a threshold is exceeded.

34. An article of manufacture comprising a program storage medium readable by a computer and embodying one or more instructions executable by said computer for causing a computer to issue I/O requests, said computer having a disk with a parallel access volume, at least one file including said I/O requests, and at least one application executing on said computer, wherein:
   computer-readable program code accesses said file by said application;
   computer-readable program code collects said I/O requests by said application wherein:
      computer-readable program code breaks said I/O requests into track-aligned I/O elements; and
      computer-readable program code determines when said I/O elements should be issued;
   computer-readable program code regroups said I/O requests by said application; and
   computer-readable program code issues said I/O requests to said disk concurrently by said application and by writing at least one said track-aligned I/O element to said disk thereby taking advantage of said parallel access volume.

35. The article of manufacture of claim 34, further comprising:
   computer-readable program code accesses data in said computer; and
   computer-readable program code associates said data with said issued I/O request.

36. The article of manufacture of claim 25, wherein said application is a database.

* * * * *